(12) United States Patent
Niermann et al.

(10) Patent No.: US 7,340,350 B2
(45) Date of Patent: Mar. 4, 2008

(54) METHODS AND SYSTEMS FOR DERIVING CHEMICAL COMPOSITIONS THAT ARE PRESENT IN A CHEMICAL PRODUCT AND FOR DETERMINING COMPLIANCE OF CHEMICAL PRODUCTS WITH GOVERNMENT REGULATIONS

(75) Inventors: Craig Andrew Niermann, Johnson City, TN (US); Paul Jayaraj Rajiah, Kingsport, TN (US); Steven James Ankabrandt, Kingsport, TN (US); Bryan Robert Swenson, Big Lake, MN (US); Abraham James Cox, Kingsport, TN (US); D. Russell Hickman, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 23 days.

(21) Appl. No.: 10/959,924

(22) Filed: Oct. 6, 2004

(65) Prior Publication Data

US 2005/0197789 A1    Sep. 8, 2005

Related U.S. Application Data

(60) Provisional application No. 60/508,948, filed on Oct. 6, 2003, provisional application No. 60/515,983, filed on Oct. 31, 2003.

(51) Int. Cl.
*G01N 31/00* (2006.01)

(52) U.S. Cl. ...................................................... 702/23

(58) Field of Classification Search .................. 702/23, 702/27, 30, 22; 700/106, 107, 108, 109
See application file for complete search history.

(56) References Cited

U.S. PATENT DOCUMENTS 5,623,403 A    4/1997    Highbloom
5,664,112 A    9/1997    Sturgeon et al.
5,726,884 A    3/1998    Sturgeon et al.
6,122,622 A    9/2000    Wiitala et al.
6,163,732 A *  12/2000   Petke et al. ................. 700/106
2004/0210396 A1* 10/2004  Fischer ........................ 702/19

OTHER PUBLICATIONS

International Search Report, PCT/US98/26286, Mar. 29, 1999.
Barcenas et al., "A System for Tracking Food Components for Labeling and Other Purposes", Food Technology, May 1998, pp. 97-102.
"SHERPA/PIMS-The Cornerstone of Company's Information Enterprise", Industrial Engineering, Apr. 1994, pp. 30-31.
Supplementary European Search Report for EP 98 96 4722, dated Mar. 30, 2005.
European Patent Office, Communication Pursuant to Article 96(2) EPC in EP 98 964722, dated Sep. 11, 2006.

* cited by examiner

*Primary Examiner*—John Barlow
*Assistant Examiner*—Xiuqin Sun
(74) *Attorney, Agent, or Firm*—Kilpatrick Stockton LLP

(57) ABSTRACT

The present invention relates to methods, systems, and computer readable media for deriving chemical compositions that are present in a chemical product to be manufactured and for determining whether the chemical product complies with government regulations. A method can comprise obtaining a bill of material including components to manufacture the chemical product; ascertaining whether any of the components includes subcomponents; replacing any components including subcomponents with the subcomponents in a revised bill of material; and deriving from the revised bill of material the chemical compositions present in the manufactured chemical product. In some embodiments, the derived chemical compositions can be compared to a stored set of government regulatory standards relating to the chemical compositions to determine compliance.

101 Claims, 11 Drawing Sheets

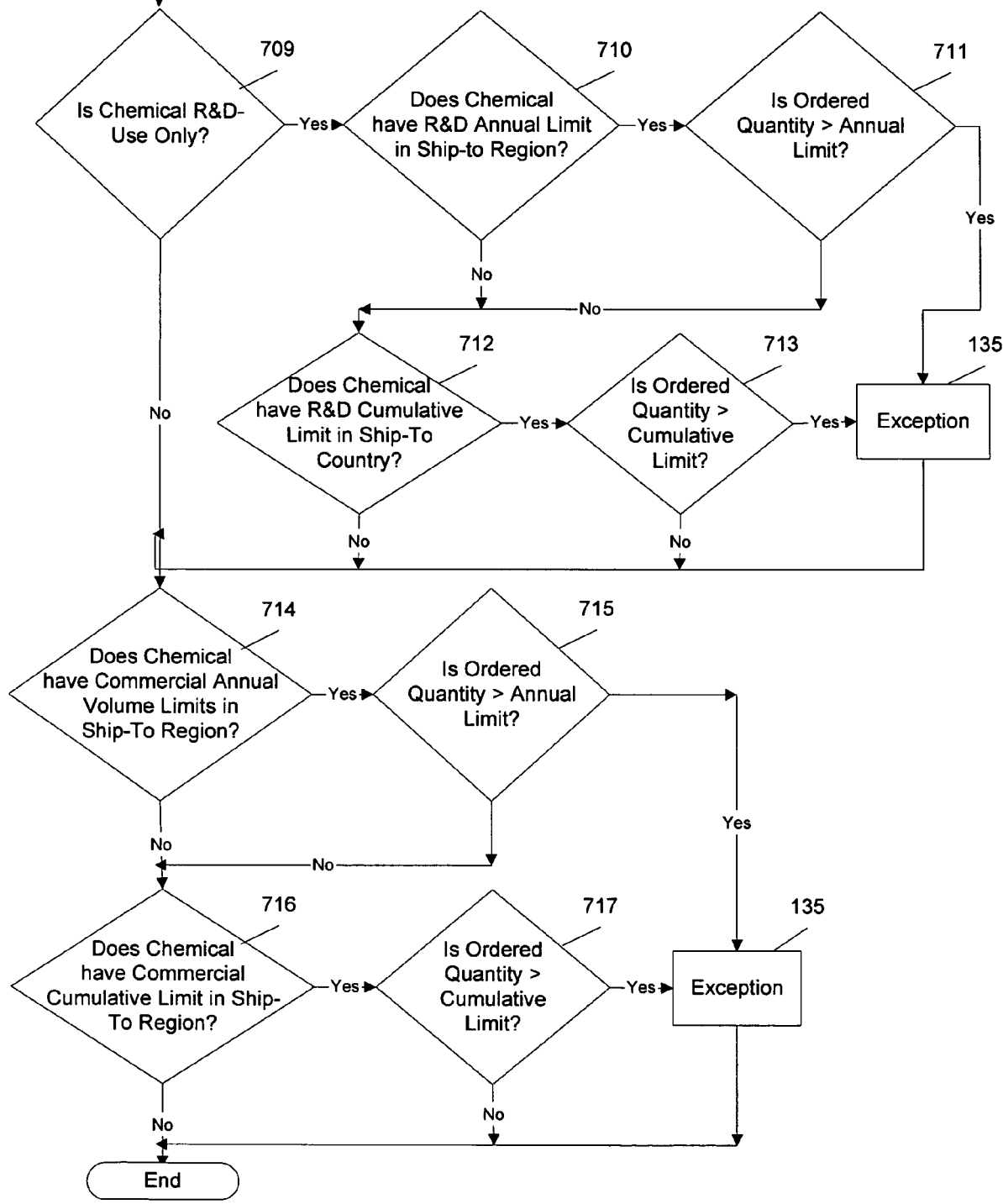

ethods and Systems for Deriving Chemical Compositions that are Present in a Chemical Product and for Determining Compliance of Chemical Products with Government Regulations

CROSS-REFERENCE TO RELATED APPLICATIONS

This application claims the benefit of U.S. Provisional Patent Application No. 60/508,948, filed Oct. 6, 2003, the entirety of which is hereby incorporated by reference, and of U.S. Provisional Patent Application No. 60/515,983, filed Oct. 31, 2003, the entirety of which is hereby incorporated by reference.

FIELD OF INVENTION

The present invention relates to computer integrated manufacturing systems and methods, and more particularly to systems and methods for chemical product manufacturing. Some embodiments of the present invention relate to methods and systems for deriving chemical compositions that are present in a chemical product to be manufactured. Some embodiments of the present invention provide regulatory compliance information for chemical compositions, including reactants, non-reactants, and chemical intermediaries, in a production process.

BACKGROUND

The manufacture of chemical products is becoming increasingly complicated as worldwide demand for chemical products, and the complexity of the products, continue to increase. Modern chemical plants are sprawling complexes, employing hundreds or thousands of employees to manufacture many diverse chemicals.

Computer systems, methods and program products have been widely used for chemical process control. For example, enterprise resource planning ("ERP") computer products can provide automated product sales order entry and can also track manufacturing bills of material and bills of substance that are used in a chemical plant to manufacture chemical products. Such enterprise resource planning products allow a manufacturer to track orders, inventory and manufacturing operations for a complex chemical plant.

Due to the toxic nature of certain chemicals, the chemical industry is regulated by many national and local laws. For example, in the United States, the Toxic Substances Control Act (TSCA) is a complex set of regulations that govern the manufacture and use of chemicals. Failure to comply with TSCA regulations can result in severe penalties for a chemical manufacturer. Unfortunately, compliance with TSCA and other regulations is becoming increasingly complicated due to the increasing number and complexity of chemical products that are being produced, and the increasing number and complexity of regulations that govern the manufactured products.

SUMMARY

The present invention comprises systems, methods, and computer-readable media for deriving chemical compositions that are present in a chemical product to be manufactured. Some embodiments of the present invention relate to systems, methods, and computer-readable media for providing regulatory information relating to chemical products. In some embodiments, the regulatory information can relate to compliance with government regulations.

According to some embodiments of the invention, chemical components that are present in a production process, including reactants, chemical components that are not reactants, and chemical components that are not be found in the chemical product to be manufactured, are ascertained, and a chemical composition is derived. The chemical compositions so ascertained, in some embodiments, can be compared to a stored set of government regulatory standards related to the chemical compositions to determine compliance. Accordingly, compliance with complex government regulations governing chemical products can be determined in some embodiments.

Some embodiments of the present invention relate to methods of deriving chemical compositions that are present in a chemical product to be manufactured. The methods can be performed in a data processing system in some embodiments. The systems, methods and computer-readable media for deriving chemical compositions that are present in a chemical product to be manufactured can be used independent of the systems, methods and computer program products for determining compliance of the chemical product to be manufactured to government regulations that govern the manufactured product. For example, some embodiments of the present invention can be used to determine compliance with contractual agreements, shipping compatibility constraints, storage limitations, and other guidelines that can be industry or company specific, and not necessarily regulated by a governmental entity.

In some embodiments, a method of deriving chemical compositions that are present in a chemical product to be manufactured comprises obtaining a bill of material comprising components to manufacture the chemical product, ascertaining whether any of the components comprises subcomponents, replacing any components comprising subcomponents with the subcomponents in a revised bill of material, and deriving from the revised bill of material the chemical compositions present in the manufactured chemical product.

In some embodiments, a method of deriving chemical compositions that are present in a chemical product to be manufactured comprises obtaining a bill of material comprising chemical components of the chemical product to be manufactured, ascertaining whether any of the chemical components comprise subcomponents, replacing the chemical components comprising subcomponents with the subcomponents in a revised bill of material, assigning a component class to each component and subcomponent, the component classes comprising at least one of bases, additives, reactants, and monomers, and deriving from the revised bill of material the chemical compositions present in the manufactured chemical product.

In some embodiments, each of the components can comprise an additive, a base, a catalyst, a monomer, a reactant, a solvent that becomes a part of the manufactured chemical product, a solvent that does not become a part of the manufactured chemical product, a catalyst, or a packaging material. Some embodiments can comprise removing particular components or subcomponents from the revised bill of material prior to deriving the chemical compositions present in the manufactured chemical product. Examples of components that can be removed include, without limitation, catalysts, solvents that do not become a part of the chemical product, and packaging materials.

In some embodiments, the components can comprise chemical intermediaries or scrap materials. Chemical intermediaries can be, for example, reaction products from another manufacturing bill of material, but that can also be components or subcomponents in other manufacturing bills of material. Scrap materials can include, for example, materials that were rejected for their original purpose for some reason, but that can still be used as a component or subcomponent in other bills of material. In some embodiments, a component or subcomponent can have its own bill of material associated with it.

Deriving the chemical compositions present in the manufactured chemical product, in some embodiments, can comprise determining the chemical compositions from the components and the subcomponents. In some embodiments, determining the chemical compositions from the components and the subcomponents comprises determining at least one product of a reaction between at least two of the components and subcomponents.

The at least one reaction product can be determined, in some embodiments, by comparing the at least two components and subcomponents and the concentrations of components and subcomponents with a plurality of reaction products, wherein each reaction product has at least two components and subcomponents and concentration ranges associated with it. Each reaction product can have a unique combination of components, subcomponents, and concentration ranges associated with it. A regulatory bill of compliance can be generated, in some embodiments, that comprises the reaction product and any unreacted components and subcomponents. Examples of unreacted components and subcomponents can include, without limitation, additives and solvents. A regulatory bill of material can be compared to a stored set of government regulatory standards relating to the chemical compositions to determine compliance in some embodiments.

Some embodiments of the present invention can comprise determining a quantity of a reaction product. Some embodiments of the present invention can account for reaction losses in determining the quantity of reaction product. Reaction losses can appear on a bill of material in some embodiments. The quantity of the reaction product can be determined, in some embodiments, by deducting the quantity of reaction loss from a total quantity of reacted components and subcomponents.

In some embodiments, determining the chemical compositions from the components and the subcomponents comprises determining at least one polymer based on polymerization of at least one component or subcomponent. The at least one component or subcomponent can comprise a monomer in some embodiments.

The at least one polymer can be determined, in some embodiments, by comparing the at least one component or subcomponent with a plurality of polymers, wherein each polymer has at least one component or subcomponent associated with it. Each polymer can have a unique combination of components and subcomponents associated with it. A regulatory bill of compliance can be generated, in some embodiments, that comprises the polymer and any unpolymerized components and subcomponents. Examples of unpolymerized components and subcomponents can include, without limitation, additives and solvents. A regulatory bill of material can be compared to a stored set of government regulatory standards relating to the chemical compositions to determine compliance in some embodiments.

Some embodiments of the present invention can comprise determining a quantity of a polymer. Some embodiments of the present invention can account for polymer reaction losses in determining the quantity of polymer. Polymer reaction losses can appear on a bill of material in some embodiments. The quantity of the polymer can be determined, in some embodiments, by deducting the quantity of polymer reaction loss from a total quantity of polymerized components and subcomponents.

In embodiments of the present invention that utilize component classes, such embodiments can further comprise verifying that the revised bill of material does not comprise a predetermined combination of component classes. An error can be generated, in some embodiments, when the revised bill of material comprises a predetermined combination of component classes.

The chemical compositions present in the manufactured chemical product, in some embodiments, can be determined from the components, the subcomponents, and the component classes. In some embodiments, wherein at least one of the components and subcomponents has a component class of monomers or identity monomers, determining the chemical compositions can comprise determining at least one polymer based on polymerization of the at least one monomer or identity monomer. The at least one polymer can be determined, in some embodiments, by comparing the at least one monomer or identity monomer and any initiators with a plurality of polymers, wherein each polymer has at least one combination of monomers, identity monomers, and initiators associated with it. In some embodiments, each polymer can have a unique combination of monomers, identity monomers, and initiators associated with it.

Some embodiments of methods of the present invention can further comprise comparing the derived chemical compositions to a stored set of government regulatory standards relating to the chemical compositions to determine compliance. The stored set of government regulator standards can comprise, in some embodiments, government regulatory standards governing the manufacturing location for the manufactured chemical product and government regulatory standards governing the destination location for the manufactured chemical product. Some embodiments of the present invention can comprise proposing modifications to noncomplying chemical products so that the chemical product to be manufactured becomes complying.

Some embodiments of the present invention relate to methods of determining compliance of a chemical product to be manufactured with government regulations that govern the chemical product comprises. The methods can be performed in a data processing system in some embodiments.

In some embodiments, a method of determining compliance of a chemical product to be manufactured with government regulations that govern the chemical product comprises obtaining a bill of material comprising components to manufacture the chemical product, ascertaining whether any of the components comprises subcomponents, replacing any components comprising subcomponents with the subcomponents in a revised bill of material, deriving from the revised bill of material the chemical compositions present in the manufactured chemical product, and comparing the derived chemical compositions to a stored set of government regulatory standards relating to the chemical compositions to determine compliance.

In some embodiments, a method of determining compliance of a chemical product to be manufactured with government regulations that govern the chemical product comprises obtaining a bill of material comprising chemical components of the chemical product to be manufactured, ascertaining whether any of the chemical components comprise subcomponents, replacing the chemical components comprising subcomponents with the subcomponents in a revised bill of material, assigning a component class to each component and subcomponent, the component classes comprising at least one of bases, additives, reactants, and monomers, deriving from the revised bill of material the chemical compositions present in the manufactured chemical product, and comparing the derived chemical compositions to a stored set of government regulatory standards relating to the chemical compositions to determine compliance.

Some embodiments of the present invention relate to systems, including systems for deriving chemical compositions that are present in a chemical product to be manufactured and systems for determining compliance of a chemical product to be manufactured with government regulations that govern the chemical product.

In some embodiments, a system for deriving chemical compositions that are present in a chemical product to be manufactured comprises means for obtaining a bill of material comprising components to manufacture the chemical product, means for ascertaining whether any of the components comprises subcomponents, means for replacing any components comprising subcomponents with the subcomponents in a revised bill of material, and means for deriving from the revised bill of material the chemical compositions present in the manufactured chemical product.

In some embodiments, a system for deriving chemical compositions that are present in a chemical product to be manufactured comprises means for obtaining a bill of material comprising chemical components of the chemical product to be manufactured, means for ascertaining whether any of the chemical components comprise subcomponents, means for replacing the chemical components comprising subcomponents with the subcomponents in a revised bill of material, means for assigning a component class to each component and subcomponent, the component classes comprising at least one of bases, additives, reactants, and monomers, and means for deriving from the revised bill of material the chemical compositions present in the manufactured chemical product.

In some embodiments, a system for determining compliance of a chemical product to be manufactured with government regulations that govern the chemical product comprises means for obtaining a bill of material comprising components to manufacture the chemical product, means for ascertaining whether any of the components comprises subcomponents, means for replacing any components comprising subcomponents with the subcomponents in a revised bill of material, means for deriving from the revised bill of material the chemical compositions present in the manufactured chemical product, and means for comparing the derived chemical compositions to a stored set of government regulatory standards relating to the chemical compositions to determine compliance.

In some embodiments, a system for determining compliance of a chemical product to be manufactured with government regulations that govern the chemical product comprises means for obtaining a bill of material comprising chemical components of the chemical product to be manufactured, means for ascertaining whether any of the chemical components comprise subcomponents, means for replacing the chemical components comprising subcomponents with the subcomponents in a revised bill of material, means for assigning a component class to each component and subcomponent, the component classes comprising at least one of bases, additives, reactants, and monomers, means for deriving from the revised bill of material the chemical compositions present in the manufactured chemical product, and means for comparing the derived chemical compositions to a stored set of government regulatory standards relating to the chemical compositions to determine compliance.

Some embodiments of the present invention relate to computer-readable media comprising computer program code for performing methods of the present invention. In some embodiments, a computer-readable medium containing computer-executable instructions for processing data comprises computer program code for obtaining a bill of material comprising components to manufacture the chemical product, computer program code for ascertaining whether any of the components comprises subcomponents, computer program code for replacing any components comprising subcomponents with the subcomponents in a revised bill of material, and computer program code for deriving from the revised bill of material the chemical compositions present in the manufactured chemical product.

In some embodiments, a computer-readable medium containing computer-executable instructions for processing data comprises computer program code for obtaining a bill of material comprising chemical components of the chemical product to be manufactured, computer program code for ascertaining whether any of the chemical components comprise subcomponents, computer program code for replacing the chemical components comprising subcomponents with the subcomponents in a revised bill of material, computer program code for assigning a component class to each component and subcomponent, the component classes comprising at least one of bases, additives, reactants, and monomers, and computer program code for deriving from the revised bill of material the chemical compositions present in the manufactured chemical product.

In some embodiments, a computer-readable medium containing computer-executable instructions for processing data comprises computer program code for obtaining a bill of material comprising components to manufacture the chemical product, computer program code for ascertaining whether any of the components comprises subcomponents, computer program code for replacing any components comprising subcomponents with the subcomponents in a revised bill of material, computer program code for deriving from the revised bill of material the chemical compositions present in the manufactured chemical product, and computer program code for comparing the derived chemical compositions to a stored set of government regulatory standards relating to the chemical compositions to determine compliance.

In some embodiments, a computer-readable medium containing computer-executable instructions for processing data comprises computer program code for obtaining a bill of material comprising chemical components of the chemical product to be manufactured, computer program code for ascertaining whether any of the chemical components comprise subcomponents, computer program code for replacing the chemical components comprising subcomponents with the subcomponents in a revised bill of material, computer program code for assigning a component class to each component and subcomponent, the component classes comprising at least one of bases, additives, reactants, and monomers, computer program code for deriving from the revised bill of material the chemical compositions present in the manufactured chemical product, and computer program code for comparing the derived chemical compositions to a stored set of government regulatory standards relating to the chemical compositions to determine compliance.

These and other embodiments of the present invention are described in greater detail in the detailed description which follows.

It is a feature and advantage of some embodiments of the present invention to provide methods and systems that can improve validation of ordered products, particularly ordered chemical products. It is another feature and advantage of some embodiments of the present invention to provide methods and systems that can prevent regulatory compliance problems that can arise with the manufacture of chemical products. It is a further feature and advantage of some embodiments of the present invention to provide methods and systems that can assist in preventing chemical control law violations and the fines or penalties that can be associated with such violations. Another feature and advantage of some embodiments of the present invention is to provide methods and systems for use in the manufacture of chemical products that can assist in avoiding product recall. It is a further feature and advantage of some embodiments of the present invention to provide methods and systems for use in the manufacture of chemical products that can enhance reporting with enterprise resource planning products, such as inventory reporting, costing estimates, SARA reporting, etc.

Additional uses, objects, advantages, and novel features of the invention will be set forth upon review of the drawings and of the detailed description that follows, and will become more apparent to those skilled in the art upon examination of the following.

BRIEF DESCRIPTION OF THE FIGURES

FIGS. 8A and 8B which together form FIG. 8 as indicated, illustrate an embodiment of the restriction checks of FIG. 7 according to some embodiments of the present invention.

DETAILED DESCRIPTION

Figure 1:
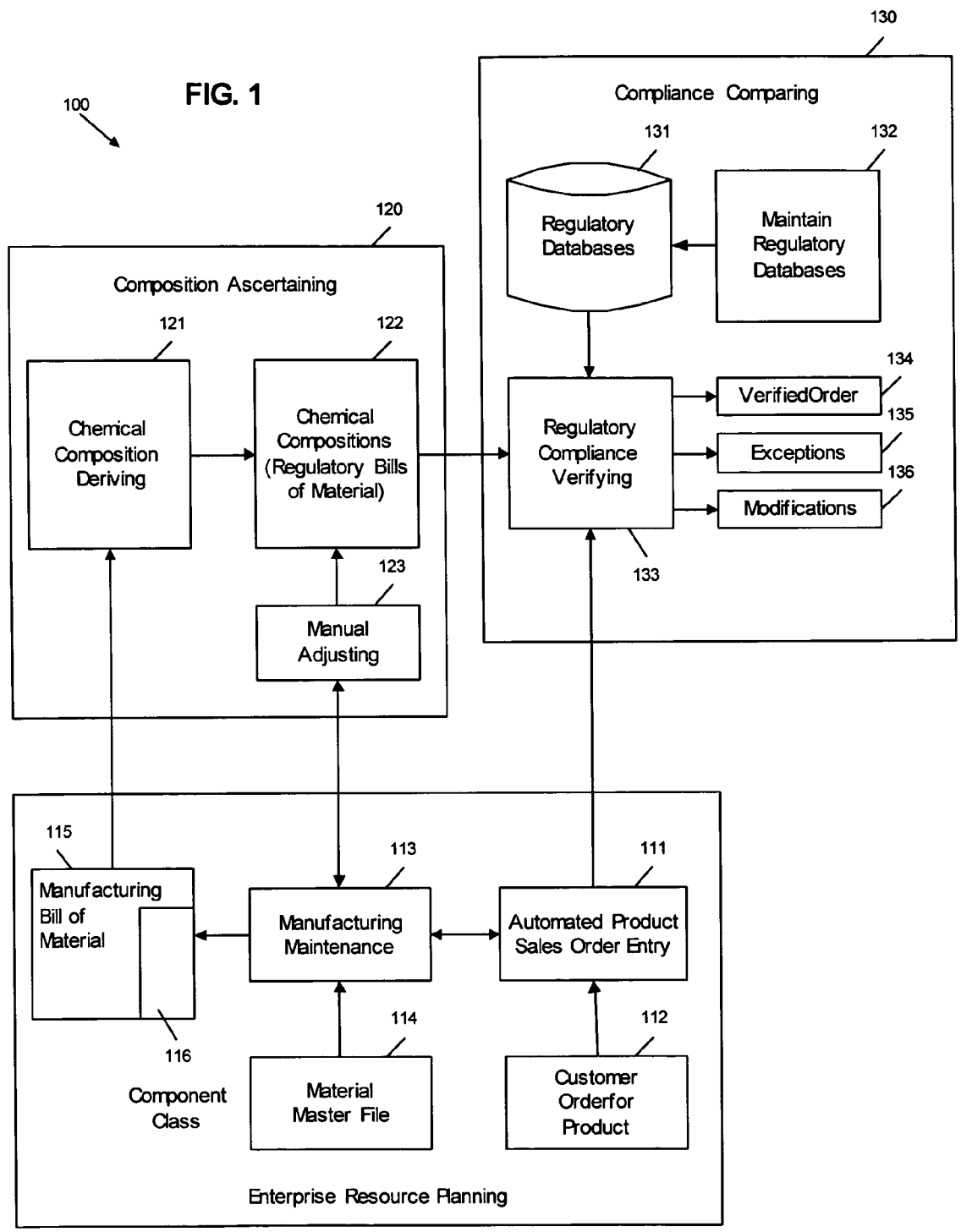
FIG. 1 is a block diagram of some embodiments of systems, methods, and computer program products for determining compliance of the chemical product to be manufactured to government regulations that govern the manufactured product according to some embodiments of the invention.

The present invention, in some embodiments, provides methods, systems, and computer-readable media for deriving chemical compositions that are present in a chemical product to be manufactured. The present invention also provides, in some embodiments, methods, systems, and computer-readable media for determining regulatory compliance in a chemical production process. While the description herein generally relates to chemical production processes, the techniques of the present invention can also be applied in other types of manufacturing processes utilizing ERP-type management systems.

Some embodiments of the present invention are particularly advantageous for use in determining compliance with governmental regulations. However, it should be understood that some embodiments of the present invention are not limited to determining compliance with governmental regulations. In some embodiments, methods, systems, and computer-readable media for deriving chemical compositions that are present in a chemical product to be manufactured can be useful in methods and systems where information related to chemical compositions present in a chemical product to be manufactured is of interest.

Some embodiments of the present invention can be used to determine compliance with contractual agreements, shipping compatibility constraints, storage limitations, and other guidelines that can be industry or company specific, and not necessarily regulated by a governmental entity. As a non-limiting example, some embodiments of the present invention can be useful to determine compliance with a supply agreement that a manufacturer has with a customer. Such an agreement can specify that the manufacturer is only allowed to supply a particular chemical component to the customer. With such an agreement, some embodiments of the present invention can comprise generating an exception if the manufacture attempts to ship a manufactured chemical product comprising the chemical component to an entity other than the customer.

In some embodiments, methods of the present invention can be used on an enterprise wide basis with manufacturing processes for a plurality of chemical products produced at a site. Use of the methods, in some embodiments, can be triggered by a customer order for one or more of the chemical products produced at the site. Use of some embodiments can be triggered by an update of information for a substance used to produce a chemical product. When such events or other events occur, some embodiments of the present invention can derive chemical compositions that are present in the chemical product to be manufactured. In some embodiments, chemical compositions that are present in a chemical product to be manufactured can be derived when a change is made to a chemical product to be manufactured, when a change is made to a process for manufacturing a chemical product, when a change is made to a component or subcomponent used to manufacture a chemical product, when a new component or subcomponent is added to a chemical product, and/or when a component or subcomponent is removed from a chemical product.

In some embodiments, a method of deriving chemical compositions that are present in a chemical product to be manufactured comprises obtaining a bill of material comprising components to manufacture the chemical product, ascertaining whether any of the components comprises subcomponents, replacing any components comprising subcomponents with the subcomponents in a revised bill of material, and deriving from the revised bill of material the chemical compositions present in the manufactured chemical product.

In some embodiments, a method of deriving chemical compositions that are present in a chemical product to be manufactured comprises obtaining a bill of material comprising chemical components of the chemical product to be manufactured, ascertaining whether any of the chemical components comprise subcomponents, replacing the chemical components comprising subcomponents with the subcomponents in a revised bill of material, assigning a component class to each component and subcomponent, the component classes comprising at least one of bases, additives, reactants, and monomers, and deriving from the revised bill of material the chemical compositions present in the manufactured chemical product.

Some embodiments of the present invention are particularly advantageous for use in determining compliance with governmental regulations. With regard to determining compliance of a chemical product to be manufactured with government regulations that govern the chemical product, some embodiments of methods of the present invention comprise obtaining a bill of material comprising components to manufacture the chemical product, ascertaining whether any of the components comprises subcomponents, replacing any components comprising subcomponents with the subcomponents in a revised bill of material, deriving from the revised bill of material the chemical compositions present in the manufactured chemical product, and comparing the derived chemical compositions to a stored set of government regulatory standards relating to the chemical compositions to determine compliance.

In some embodiments, a method of determining compliance of a chemical product to be manufactured with government regulations that govern the chemical product comprises obtaining a bill of material comprising chemical components of the chemical product to be manufactured, ascertaining whether any of the chemical components comprise subcomponents, replacing the chemical components comprising subcomponents with the subcomponents in a revised bill of material, assigning a component class to each component and subcomponent, the component classes comprising at least one of bases, additives, reactants, and monomers, deriving from the revised bill of material the chemical compositions present in the manufactured chemical product, and comparing the derived chemical compositions to a stored set of government regulatory standards relating to the chemical compositions to determine compliance.

In another aspect, some embodiments of the present invention relate to systems, such as data processing systems for implementing the methods of the present invention. The systems can include computer hardware and software for performing the steps outlined above.

In a further aspect, some embodiments of the present invention relate to computer-readable media comprising computer program code for performing the methods of the present invention.

The Figures provide schematic overviews of some embodiments of methods and systems of the present invention. It will be understood that each element of the illustrations, and combinations of elements in the illustrations, in the Figures, can be implemented by general and/or special purpose hardware-based systems that perform the specified functions or tasks, or by combinations of general and/or special purpose hardware and computer instructions (or computer program code). Some embodiments of the present invention relate to a computer-readable medium, having computer-readable instructions or computer program code for performing the specified functions, tasks, or steps.

This computer program code can be provided to a processor to produce a machine, such that the program code that executes on the processor creates means for implementing the functions and tasks specified in the illustrations. The computer program code can be executed by a processor to cause a series of operational steps to be performed by the processor to produce a computer implemented process such that the code which executes on the processor provides steps for implementing the functions and tasks specified in the illustrations. Accordingly, the description contained herein and the Figures support combinations of means for performing the specified functions, combinations of steps for performing the specified functions, and computer program code for performing the specified functions.

It will be understood that systems, methods and computer program products according to the present invention can be advantageously implemented as a stored computer software program that executes on a data processing system. Any such system can be used. In some embodiments, a legacy data processing system, such as an IBM Model S/390 can be used. In some embodiments, midrange or personal systems, or a network of legacy, midrange and personal systems, are used.

The systems, methods and computer program products of the present invention advantageously interact with and enhance enterprise resource planning systems. In some embodiments, the enterprise resource planning system is a legacy system that is used for automated product sales order entry and for maintenance of manufacturing bills of material that are used in chemical product manufacturing. As will be described below, manufacturing bills of material can be modified to include component classes. Examples of enterprise resource planning systems include, without limitation, SAP systems, PeopleSoft systems, and Oracle systems.

The processing undertaken in the present invention can be performed in the foreground, or background of the computer system. It is often advantageous to use background processing for many tasks.

By way of general overview, the systems, methods and computer program products of the present invention are similar to those described in the aforementioned, commonly assigned, U.S. Pat. No. 6,163,732, the disclosure of which is incorporated herein by reference. Embodiments of the present invention provide a number of features not present in U.S. Pat. No. 6,163,732. To the extent that terms are defined or used differently herein or that the description of the present invention herein differs from the definition and usage of terms and the description in the '732 patent, the present specification controls over the '732 patent.

FIG. 1 illustrates some embodiments of an architecture of systems, methods, and computer-readable media of the present invention for determining compliance of a chemical product to be manufactured to government regulations that govern the manufactured product. It will be understood that systems, methods, and computer-readable media 100 according to some embodiments of the present invention can be implemented as a stored program that executes on a data processing system. A legacy data processing system, such as an IBM Model S/390 can be used in some embodiments. In other embodiments, midrange or personal system, or a network of legacy, midrange, and personal systems can be used.

As also shown in FIG. 1, some embodiments of the present invention can include three major components: enterprise resource planning 110, composition ascertaining 120, and compliance comparing 130. Briefly, enterprise resource planning 110 can be a system that is used for automated product sales order entry and for maintenance of manufacturing bills of material that are used in chemical product manufacturing. As will be described below, manufacturing bills of material can be modified to include component classes. A non-limiting example of an enterprise resource planning system that can be used for component 110 in some embodiments is SAP Release 3, which is marketed by SAP AG.

Composition ascertaining 120 ascertains which chemical compositions are present in the chemical product to be manufactured. The chemical compositions can be ascertained in foreground or background processing. Compliance comparing 130 compares the chemical compositions so ascertained to a stored set of government regulatory standards relating to the chemical compositions to determine compliance.

A more detailed description of some embodiments of enterprise resource planning 110, composition ascertaining 120, and compliance comparing 130 will now be provided. More specifically, enterprise resource planning 110 includes automated product sales order entry 111 that is responsive to a customer order for a product 112. Automated product sales order entry 111 interacts with manufacturing maintenance 113 to provide computer integrated manufacturing, using techniques well known to those of skill in the art. Manufacturing maintenance 113 is responsive to a material master file 114 to create a manufacturing bill of material (BOM) 115. The manufacturing bill of material is a list of material that is used in the chemical manufacturing process to manufacture a product. As described below, manufacturing bills of material according to the present invention can include a component class 116 associated with each material component in the manufacturing bill of material. The component class can be used during composition ascertaining 120 to ascertain which chemical compositions are present in the chemical product to be manufactured.

Additional description of composition ascertaining 120 will now be provided and will also be provided below. In the embodiments shown in FIG. 1, chemical composition deriving 121 uses the manufacturing bills of material 115, including the component classes 116 and other information associated with material components in the manufacturing bills of material, to derive material chemical compositions, also known as regulatory bills of material 122, that define the chemical compositions that are present in the chemical product to be manufactured. As will be described in detail below, chemical composition deriving 121 uses the component classes 116 and other information associated with the components listed in the manufacturing bills of material, to determine the chemical compositions 122.

Composition ascertaining 120 can also comprise manual adjusting 123 in some embodiments. As will be described below, manual adjusting can be used to account for impurities that can be part of the chemical composition, even though the impurities may not officially be part of the manufacturing bill of material 115. If it is known that impurities are contained in the chemical composition, manual adjusting 123 can be used to add impurities to the chemical composition 122 to account for impurities that are present in the manufactured chemical product. Alternatively, as shown in FIG. 1, manual adjusting can be used to adjust the manufacturing maintenance 113, so that the manufacturing bill of material 115 also includes the impurities that will be included in the chemical compositions 122.

The chemical compositions or regulatory bills of material 122 are provided to compliance comparing 130. Compliance comparing 130 comprises regulatory databases 131 that can include a list of regulations that apply to chemical products. The regulatory databases can be maintained 132 by adding new regulations or updating existing regulations. The regulatory databases 131, chemical compositions 122, and customer orders 112 are input to compliance verifying 133.

Compliance verifying 133 can comprise comparing the chemical compositions 122 to the stored set of government regulatory standards in the regulatory databases 131 for a customer order 112, in order to determine whether the chemical product to be manufactured complies with government regulations that govern the manufactured product. Regulatory compliance verifying 133 can produce a verified order 134 that indicates that the chemical compositions do comply with the applicable government regulations, or can produce an exceptions list 135 that indicate particular chemical compositions and/or regulations that are violated. In some embodiments, modifications 136 can be suggested to render the chemical composition complying.

Additional and more detailed descriptions of methods, systems, and computer program products of the present invention will be provide below. In order to provide consistent terminology, definitions will first be provided.

DEFINITIONS

The following definitions apply herein unless otherwise specified:

Material: A "material" is a substance or article used in, or incidental to, the manufacture of other materials or a chemical product in a chemical manufacturing process. For example, a chemical product to be manufactured can be a material, as well as each of the components and subcomponents used to manufacture the chemical product. A material can also be a byproduct of a chemical product to be manufactured, a chemical intermediary produced during the manufacture of a chemical product, and a scrap material.

Chemical Product: A "chemical product" is a material to be produced by a chemical manufacturing process according to a manufacturing bill of material. In some embodiments, different types of packaging that each contains the same chemical composition are classified as unique chemical products. For example, acetic acid can be a material but bulk acetic acid, acetic acid in 55 gallon drums, and acetic acid in 1 quart sample jars, are three unique chemical products. In some embodiments, a chemical product can be a chemical component in the manufacture of a different chemical product.

Chemical Component: A "chemical component" is a chemical material used to manufacture a chemical product. A chemical component can be a pure chemical or a mixture. A chemical component can be a reactant, a monomer, a catalyst, a solvent, an initiator, a base, an additive, or any other chemical material. A chemical component that is a mixture can include subcomponents, which can be pure chemicals in some embodiments or can be mixtures themselves. Packaging materials used to package a chemical composition for a chemical product are not chemical components. In some embodiments, a chemical product can be a chemical component in the manufacture of a different chemical product.

Component: A "component" is a material used to manufacture a chemical product. A component can be a chemical component (as set forth above) or a non-chemical component (e.g., packaging materials, disposable process equipment, etc.). A component can include subcomponents in some embodiments. For example, when a component is a chemical component that includes subcomponents, the subcomponents can be pure components or can be mixtures themselves.

Manufacturing Bill of Material, or Bill of Material: This is a list of materials used in a chemical manufacturing process to produce a chemical product. A bill of material can also be referred to as a "recipe" that is used in manufacturing. A bill of material can comprise chemical components that can chemically react to form a new chemical (including, but not limited to polymerization reactions), can form a physical mixture, or can perform some combination of reacting and formation of mixtures. A bill of material can also contain chemical components that do not become part of the final chemical product, such as solvents and catalysts. A manufacturing bill of material can also comprise materials that are used to package a chemical composition.

Regulatory Bill of Material: This is a list of chemicals present in a material that are relevant for checking the material's regulatory compliance. It will be understood that the regulatory bills of material are not true chemical analyses or chemical standards for the material, and generally are not used in assay analyses or other similar processes. Rather, the regulatory bill of material includes only those materials that are relevant for regulatory compliance verifying. Regulatory bills of material are maintained for the chemical product family because the family represents the chemical makeup of the chemical product. Regulatory bills of material are not limited to use in determining compliance with government regulatory standards. A regulatory bill of material, for example, can be used to determine compliance with contractual agreements, shipping compatibility constraints, storage limitations, and other guidelines that can be industry or company specific, and not necessarily regulated by a governmental entity.

Chemical Identifier: A chemical identifier uniquely identifies a chemical component, such as a pure chemical (e.g., benzene, toluene, polyester, etc.). The chemical identifier, in some embodiments, can be a unique combination of letters, numbers, symbols, or combinations thereof associated with the chemical component. In some embodiments where the manufacturer purchases a proprietary mixture from a third party (i.e., the manufacturer is not aware of the components of the mixture), a proprietary mixture can be assigned a chemical identifier.

Chemical Product Family, also referred to as "Family": This is a general inventory grouping of chemical products used to isolate the chemical nature of the chemical products in the group. Classification into families ignores differences in chemical product identifications stemming from packaging, manufacturing location, etc. For example, in some embodiments, "Family A" represents "acetic acid", grouping three materials: "bulk acetic acid," "acetic acid in 55 gallon drums," and "acetic acid in one quart sample jars." Each family has an associated product identifier that indicates the primary chemical substance or mixture associated with it. This product identifier generally does not represent a bill of material.

Component Class: These are chemical classifications assigned to a material component in a manufacturing bill of material. Component classes can be used to filter components that are relevant for deriving a regulatory bill of material from a manufacturing bill of material. The following component classes can be used in some embodiments: ADD (Additive); BAS (Base); CAT (Catalyst); IDM (Identity Monomer); IGN (Ignore); INT (Initiator); MON (Monomer); PAC (Packaging); PHA (Phantom Material); PXL (Polymer Reaction Loss); REA (Reactant); RXL (Reaction Loss); SPD (Product Solvent); SPR (Process Solvent); and TAR (Target). Derivation rules can be associated with each component class to derive a chemical composition. For example, the following component classes can be ignored in the derivation process in some embodiments: IGN (Ignore); PAC (Packaging Material); and SPR (Process Solvent). Component classes will be described in detail below in connection with enterprise resource planning 110.

Enterprise Resource Planning 110

Enterprise resource planning according to the present invention will now be described. Enterprise resource planning 110 can include automated product sales order entry 111 that responds to customer orders for a product 112. Manufacturing maintenance component 113 is responsive to a material master file to generate manufacturing bills of material 115. Blocks 111, 112, 113, 114 and 115 are well known to those of skill in the art and need not be described in detail herein.

Some embodiments of the present invention include modifying manufacturing maintenance 113 and manufacturing bills of material 11 to add component classifications. Conventionally, manufacturing maintenance 113 is used to select a manufacturing bill of material 115 from material master file 114 to provide a recipe for manufacturing a chemical product.

A component classification (also referred to as a "component class") is assigned to each component of a manufacturing BOM. A component can be assigned to different component classes depending on the chemical product to be produced. For example, water can be a product solvent in some manufacturing bills of material and can be a reactant in other manufacturing bills of material. Thus, in some embodiments, the component class to which a component is assigned can depend on the chemical product to be manufactured. In some embodiments, a component can only be assigned to a single component class in a particular manufacturing bill of material.

Component classes that can be assigned to components in some embodiments of the present invention are summarized below:

ADD (Additive Material): A chemical added to a base material, reaction product, polymer, or other material, either during formulation or during synthesis, which does not react to form the target material. Additives often have a useful function. For example, titanium dioxide is an additive that can be added to a polyester to deluster the polyester. In some embodiments, during composition ascertaining 120, additives are carried through to the regulatory bill of material.

BAS (Base Material): The base material is the most important component of a mixture. Additives can be added to the base material, in some embodiments, to provide a mixture. The base material can be, for example, the component that is of interest to a customer of the manufacturer. An example of a base material is cellulose acetate butyrate in a cellulosic plastic formula. In some embodiments, during composition ascertaining, base materials are carried through to the regulatory bill of material.

MON (Monomer Material): A monomer that is a reactant for a polymer and becomes part of the final polymer. Examples of monomers can include ethylene monomer and propylene monomer used to form a copolyester. Monomers, and other chemical components (e.g., initiators (INT), identity monomers (IDM), etc.) in some cases, can be used to derive a polymer for a regulatory bill of material, and the polymer can appear on the regulatory bill of material.

CAT (Catalyst Material): A material used to increase the speed or extent of reaction. In some embodiments, once the reaction is over, the catalyst can become part of the regulatory bill of material (e.g., if the catalyst is not consumed during the reaction). In some embodiments, the catalyst does not become part of the composition and becomes waste or a byproduct. The amount of catalyst material will appear as a positive quantity on a manufacturing bill of material if it is to be carried through to the regulatory bill of material.

IDM (Identity Monomer Material): A monomer subsumed in polymerization that must be included in the polymer definition to determine which polymer will be produced regardless of the concentration in the final polymer. For example, some embodiments of the present invention can use a rule on concentration amounts where monomers are not included in the derivation of the polymer to be produced when the concentration of the monomer is less than or equal to two weight percent. However, identity monomers are considered even if present in an amount less than two weight percent of the total monomers and other polymerization materials. An identity monomer, and other chemical components (e.g., monomers, initiator materials, etc.) in some cases, can be used to derive a polymer for a regulatory bill of material, and the polymer can appear on the regulatory bill of material.

IGN (Ignore Material): A material that is ignored for regulatory purposes and is not listed on the regulatory bill of material. For example, a material that is used to manufacture a chemical product, but is not regulated can be classified as IGN. In some embodiments, such materials include special clothing required to be worn by technicians during manufacture of the chemical product. The clothing can be included on the manufacturing bill of material for cost and inventory purposes, but may not be relevant for determining regulatory compliance.

INT (Initiator Material): A reactant used to manufacture a polymer that is not a monomer, but becomes part of the polymer. An example of an initiator material is benzoyl peroxide when used to manufacture branched polyethylene. An initiator material, and other chemical components (e.g., monomers, identity monomers, etc.) in some cases, can be used to derive a polymer for a regulatory bill of material, and the polymer will appear on the regulatory bill of material.

PAC (Packaging Material): A material used to package a chemical composition. Packaging materials are ignored for regulatory purposes and are not carried through to the regulatory bill of material.

PHA (Phantom Material): A plurality of materials that have a unique identifier (e.g., item number, product number, etc.), such that they can be included in various manufacturing bills of material using the phantom material's identifier, rather than an identifier associated with each material comprising the phantom material. The use of phantom materials in some embodiments of the present invention can reduce data entry. In addition, if a change is made to the phantom material, the phantom material's profile can be updated and the bills of material for all chemical products including the phantom material will be updated without having to revise the bills of material individually. An example of a phantom material can be a group of packaging materials, such as a drum, a drum liner, and a lid. Another example of a phantom material can be a mixture of additives, inhibitors, or other materials that are commonly used together.

PXL (Polymer Reaction Loss Material): Accounts for reaction losses associated with polymerization. In some embodiments, if 1000 kilograms of monomer A are polymerized with 1000 kilograms of monomer B to produce 1500 kilograms of polymer C and 500 kilograms of a scrap material, byproduct, or other material that does not become a part of the chemical product (e.g., water), the manufacturing bill of material optionally lists the scrap material, byproduct, or other material as a polymer reaction loss material. In some embodiments of the present invention, polymer reaction loss materials are shown as negative quantities. In some embodiments, when calculating the final weight of a polymer derived from monomers and other materials, polymer reaction losses are subtracted from the total weight of the monomers and other materials to determine the weight of the polymer. Examples of polymer reaction loss materials can include, without limitation, water and methanol.

REA (Reactant Material): Chemical component that reacts to form a non-polymeric chemical. Reactants and the weight percentages of the reactants used can be used to derive a reaction product for the regulatory bill of material. As an example, ethanol and acetic acid are two reactants that can be used to manufacture ethyl acetate.

RXL (Reaction Loss Material): Accounts for reaction losses associated with a particular reaction. In some embodiments, if 1000 kilograms of reactant A are reacted with 1000 kilograms of reactant B to produce 1500 kilograms of reaction product C and 500 kilograms of a scrap material, byproduct, or other material that does not become a part of the chemical product (e.g., water), the manufacturing bill of material optionally lists the scrap material, byproduct, or other material as a reaction loss material. In some embodiments of the present invention, reaction loss materials are shown as negative quantities. In some embodiments, when calculating the final weight of a reaction product, reaction losses are subtracted from the total weight of the reactants to determine the weight of the reaction product. Further, when deriving the reaction product produced by the reaction in some embodiments, methods and systems of the present invention can refer to a table of reaction products and their respective reactants and reactant concentration ranges. When determining the concentration (e.g., weight percentage) of a reaction product on a regulatory bill of material, the amount of reaction loss material can be subtracted from the total weight of reaction product. An example of a reaction loss material is water.

SPD (Product Solvent Material): A solvent or other processing aid that becomes part of the manufactured chemical product. In some embodiments, during composition ascertaining 120, product solvent materials are carried through to the regulatory bill of material. An example of a product solvent material is water in a latex paint product.

SPR (Process Solvent Material): A solvent or other processing aid that does not become part of the manufactured chemical product. Process solvent materials are ignored for regulatory purposes and may not appear on regulatory bills of material in some embodiments, unless trace amounts of the process solvent material is regulated. Examples of process solvent materials include, without limitation, solvents such as water or hexane that are removed (e.g., by evaporation, decantation, phase separation, or other methods) at some stage during the process and compounds useful to adjust pH such as sodium hydroxide.

TAR (Target Material): The chemical product for which a regulatory bill of material is desired. If the target material is the only item in a manufacturing bill of material, then the regulatory bill of material becomes the manufacturing bill of material. Examples of target materials can include, without limitation, hydroquinone that is repackaged for resale and polyethylene terepthalate that is to be purchased for resale. Examples of target materials can include, without limitation, chemicals that are simply resold or that are resold after repackaging without any chemical or physical processing other than repackaging.

Component classifications 116 are assigned to materials listed on a manufacturing bill of material 115 so that the materials to be listed on a regulatory bill of material 122 can be determined from knowledge of how the components are used in the manufacturing process. Chemical manufacturing processes generally fall into one of four categories:

(1) Reactions: Chemical components are reacted, sometimes in the presence of catalysts and other processing aids, to create a new chemical, sometimes with byproducts. Examples of reactions can include, without limitation, the manufacture of various acids, solvents, esters, etc. In some embodiments of the present invention, the following classes of components are found in manufacturing bills of material for reactions: CAT, IGN, PAC, REA, RXL, and SPD.

(2) Mixtures: Different chemical components are blended to create a mixture, such as a base chemical with various additives. Reaction products and polymers can be base materials and be blended with other components to create mixtures. Examples of mixtures can include, without limitation, compounded plastics, chemical blends, denatured alcohols, acetate fibers, etc. In some embodiments of the present invention, the following classes of components are found in manufacturing bills of material for mixtures: ADD, BAS, IGN, PAC, SPD, SPR.

(3) Polymerizations: Monomers are formed into polymers, sometimes with the aid of initiators, catalysts, and the addition of various additives. Examples of polymerizations can include, without limitation, the manufacture of polyethylene and polyester. In some embodiments of the present invention, the following classes of components are found in manufacturing bills of material for polymerizations: ADD, CAT, IDM, IGN, INT, MON, PAC, PXL, SPD, and SPR.

(4) Packaging: An already-produced target material, stored in bulk, is packaged into a drum, bag, box, etc. For example, a target material can be placed into a packaging material. It should also be noted that packaging can be an aspect of another chemical manufacturing process, such as reactions, polymerizations, and mixtures. In some embodiments of the present invention, the following classes of components are found in manufacturing bills of material for packaging: TAR and PAC.

As noted above, the different processes will have certain component classifications in their manufacturing bills of material that will be used to derive the components in the chemical product to be manufactured and listed on the regulatory bill of material. Components that are generally relevant to the derivation of the components in the chemical product can include, without limitation, ADD, BAS, CAT, IDM, INT, MON, PXL, REA, RXL, and SPD. Such components are used, in some embodiments, to determine the type of process and the components that will be stored in the regulatory bills of material. The general approach for each process will be described in more detail below.

Returning again to FIG. 1, a production engineer can utilize manufacturing maintenance 113 to create manufacturing bills of material 115 including component classifications 116 (or component classes). The production engineer will have cognizance of the materials and the type of classifications that are to be added. In some embodiments, details about a material or component in manufacturing maintenance 113 can be provided by a supplier of the material or component to the chemical manufacturer. In some embodiments, the supplier can electronically submit the material or component data to the chemical manufacturer.

It will be understood by those of skill in the art that in some embodiments, component classifications 116 for a manufacturing bill of Material 115 can be added using manufacturing maintenance 113 in background processing in response to anticipated production of a new manufacturing bill of material. In some embodiments, component classifications 116 can be added in foreground processing in response to a receipt of a customer order for a product 112 by automated product sales order entry 111.

Composition Ascertaining 120

Composition ascertaining comprises deriving the regulatory bill of material 122 from the manufacturing bill of material 115. Chemical composition deriving 121 derives from the manufacturing bill of material 115 the chemical compositions present in the manufactured chemical product to thereby produce a regulatory bill of material. Manual adjusting 123 can be used, in some embodiments, to adjust the regulatory bills of material for impurities and to make other corrections.

Figure 2:
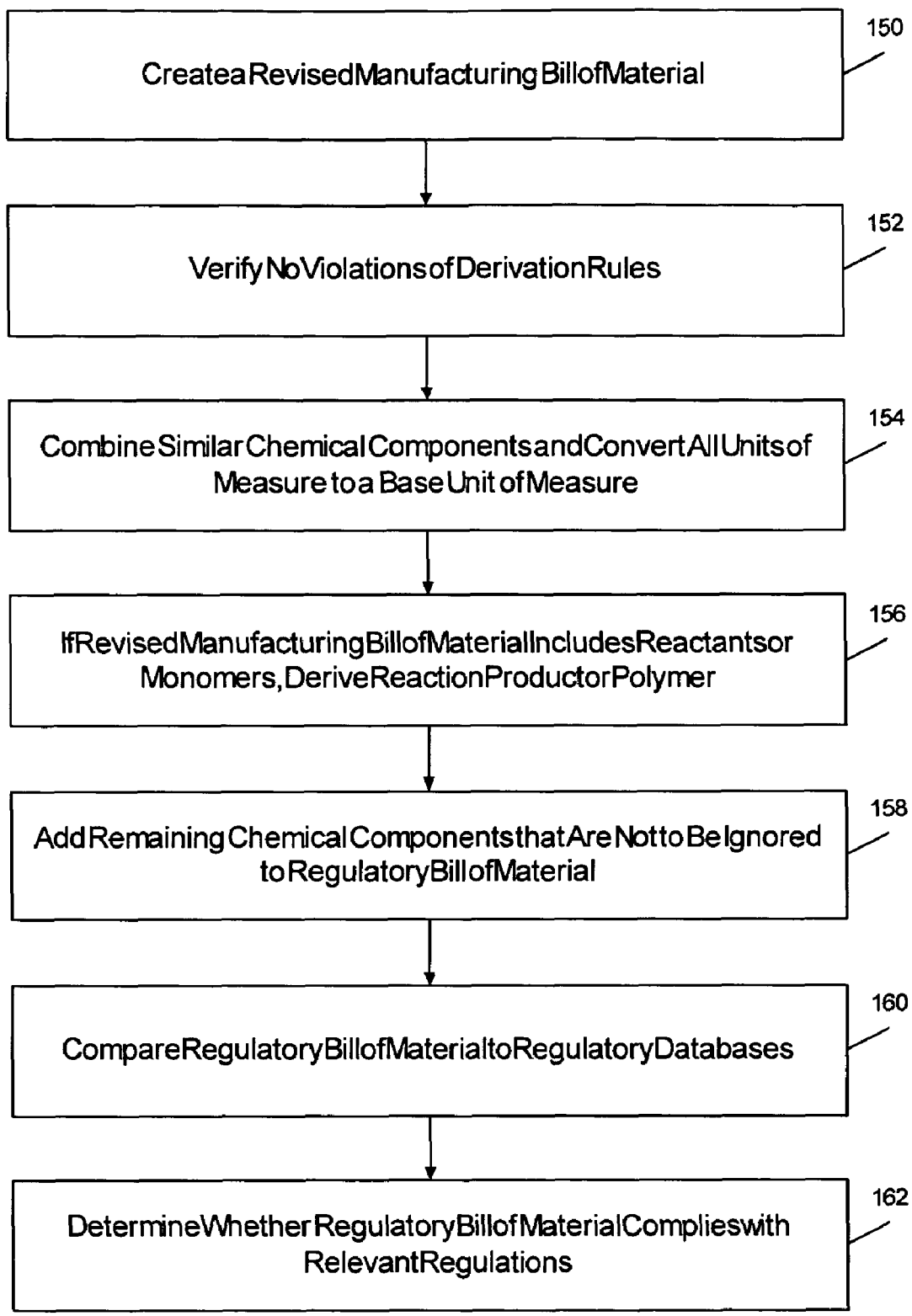
FIG. 2 illustrates a process flow of methods, systems, and computer program products according to some embodiments of the present invention.

FIG. 2 illustrates process flow for methods, systems, and computer program products according to some embodiments of the present invention. FIG. 2 includes aspects of composition ascertaining 120 and aspects of compliance comparing 130.

A manufacturing bill of material is obtained or received. In some embodiments, the manufacturing bill of material can include, without limitation, the components, along with their quantity, unit of measure, component class, subclass, and target quantity. The quantity and unit of measure fields are self-explanatory, and component classes were explained above. If a component is a mixture, the component's subclass field can be populated. The subclass can be selected, in some embodiments, to expand the mixture into its subcomponents. The target quantity field will often be 100% indicating that all of the component provided is used. In some embodiments, the target quantity field can be less than 100%. For example, in some embodiments in which excess reactant is provided to drive a reaction, then the target quantity of the reactant can be less than 100% (e.g., 50%, 70%, etc.), and the remainder of the component is classified as a reaction product loss.

Upon receiving a manufacturing bill of material, the manufacturing bill of material can be modified in some embodiments of the present invention. A revised bill of material is created 150, in some embodiments, by removing some components and/or by expanding some components (e.g., mixtures and phantom materials) into subcomponents and/or by combining components or subcomponents that are the same. For example, some component classes can belong to an exclusion set, such that components belonging to an exclusion class are removed from the bill of material and not included in a regulatory bill of material. In some embodiments of the present invention, the following classes of component can be removed from manufacturing bills of material as belonging to an exclusion set: ignore materials (IGN), packaging materials (PAC), and process solvent materials (SPR).

In some embodiments, some components are mixtures and can have subclasses of components or subcomponents. Some embodiments of systems and methods of the present invention check to see whether any of the chemical components are mixtures. While embodiments exist in which any of the chemical components or combination of chemical components can be mixtures, component classes that more frequently include subclasses are reactants (REA), monomers (MON), and initiators (INT). In such embodiments, a revised bill of material can be created by expanding any mixtures into their subclasses. In these embodiments, the components in the subclass (or subcomponents) will replace the mixture component on the revised bill of material. As the subcomponents are also components, they can have the same information associated with them as components (e.g., quantity, unit of measure, component class, etc.). All mixtures present as components of a manufacturing bill of material can be expanded into subcomponents to create a revised bill of material.

Phantom materials, like mixtures, also comprise a plurality of components. Thus, creating a revised bill of material can also comprise replacing any phantom materials (PHA) in the manufacturing bill of material with their subcomponents.

In embodiments where the manufacturing bill of material does not include any component classes from the exclusion set and where none of the components are mixtures or phantom materials, the revised bill of material can be the same as the manufacturing bill of material. In some embodiments, a revised bill of material for a mixture can be the same as the manufacturing bill of material.

Some embodiments of the present invention comprise derivation rules which provide guidance for deriving chemical compositions from a manufacturing bill of material or a revised bill of material. Derivation rules can also be used, in some embodiments, to avoid combinations of components that are not chemically or physically logical and/or to help prevent interference with derivation of the chemical compositions.

After the revised bill of material is created 150, some embodiments of the present invention comprise verifying that the components on the revised bill of material do not violate any derivation rules 152. Any number of derivation rules can be included in embodiments of the present invention. The following is a non-exclusive list of examples of derivation rules that can be included in some embodiments of the present invention:

(a) ADD can only be used with BAS, MON, REA, or TAR and can not be used alone.
(b) BAS can not be used with MON, REA, or TAR.
(c) MON can not be used with BAS, REA, or TAR.
(d) IDM requires at least one MON.
(e) INT requires at least one MON or at least one REA.
(f) PXL requires at least one MON and must be a negative quantity.
(g) REA cannot be used with BAS, MON, or TAR.
(h) RXL requires at least one REA and must be a negative quantity.
(i) SPD cannot be used with TAR.
(j) TAR cannot be used with BAS, MON, REA, or SPD.

Some embodiments of the present invention use all of the above derivation rules, while other embodiments use one or a combination of the above derivation rules. Further, some embodiments use all or a portion of the above derivation rules as well as other derivation rules not listed above.

If no derivation rules are violated 152 in accordance with FIG. 2, similar components are combined and all units of measure are converted to a base unit of measure in some embodiments 154. If any of the components have a target quantity of less than 100%, such component's quantity can be reduced appropriately before combining components and converting the units of measure.

To combine similar components 154, in some embodiments, the components are the same chemical component having the same chemical identifier. In some embodiments, a component can be a separate component on a manufacturing bill of material and can also be a subcomponent of a mixture on the manufacturing bill of material. In such embodiments, the amounts of the component are combined 154, and the component can be shown as a single entry on the revised bill of material.

Because the amounts and relative amounts of the components can be important in chemical ascertaining and in compliance comparing, the units of measure of the components can be converted 154 to a base unit of measure (e.g., kilograms, grams, gallons, etc.) in some embodiments. Converting to a base unit of measurement 154 can assist in calculating the relative amounts of each component present.

If the revised bill of material includes a reactant, then all reactants (REA), catalyst materials (CAT), reaction loss materials (RXL), and product solvent materials (SPD) can be used to determine the regulatory bill of material. The reactants (REA) and reaction loss materials (RXL) can be used to derive a reaction product and a quantity of the reaction product. Deriving a reaction product will be discussed in more detail below in connection with FIGS. 3-5 and Example 3.

If the revised bill of material includes a monomer, then all monomers (MON), identity monomer materials (IDM), initiator materials (INT), catalyst materials (CAT), polymer reaction loss materials (PXL), and product solvent materials (SPD) can be used to determine the regulatory bill of material. The monomers (MON), identity monomer materials (IDM), initiator materials (INT), and polymer reaction loss materials (PXL) can be used to derive a polymer and a quantity of the polymer. Deriving a polymer will be discussed in more detail below in connection with FIGS. 3-5 and Examples 1 and 2.

If a reaction product or polymer is produced, the reaction product or the polymer can be added to a regulatory bill of material in some embodiments. In addition, the remaining, unreacted components from the revised bill of material can also be added 158 to the regulatory bill of material in some embodiments. Examples of such unreacted component include, in some embodiments; additive materials (ADD), catalyst materials (CAT), and product solvent materials (SPD). If there is no reaction or polymerization, then the components from the new revised bill of material (e.g., ADD, BAS, TAR, and/or SPD) are added to the regulatory bill of material. When the components are added to the regulatory bill of material, the weight percentages of the components are calculated and balanced to total 100%. In some embodiments, the individual percentages of each component are included on the regulatory bill of material.

After the regulatory bill of material is completed, the regulatory bill of material can be compared 160 to the regulatory databases to determine 162 whether the regulatory bill of material complies with the relevant regulations. Additional information regarding the comparison and compliance determination aspects of the present invention is provided in more detail below.

Figure 3:
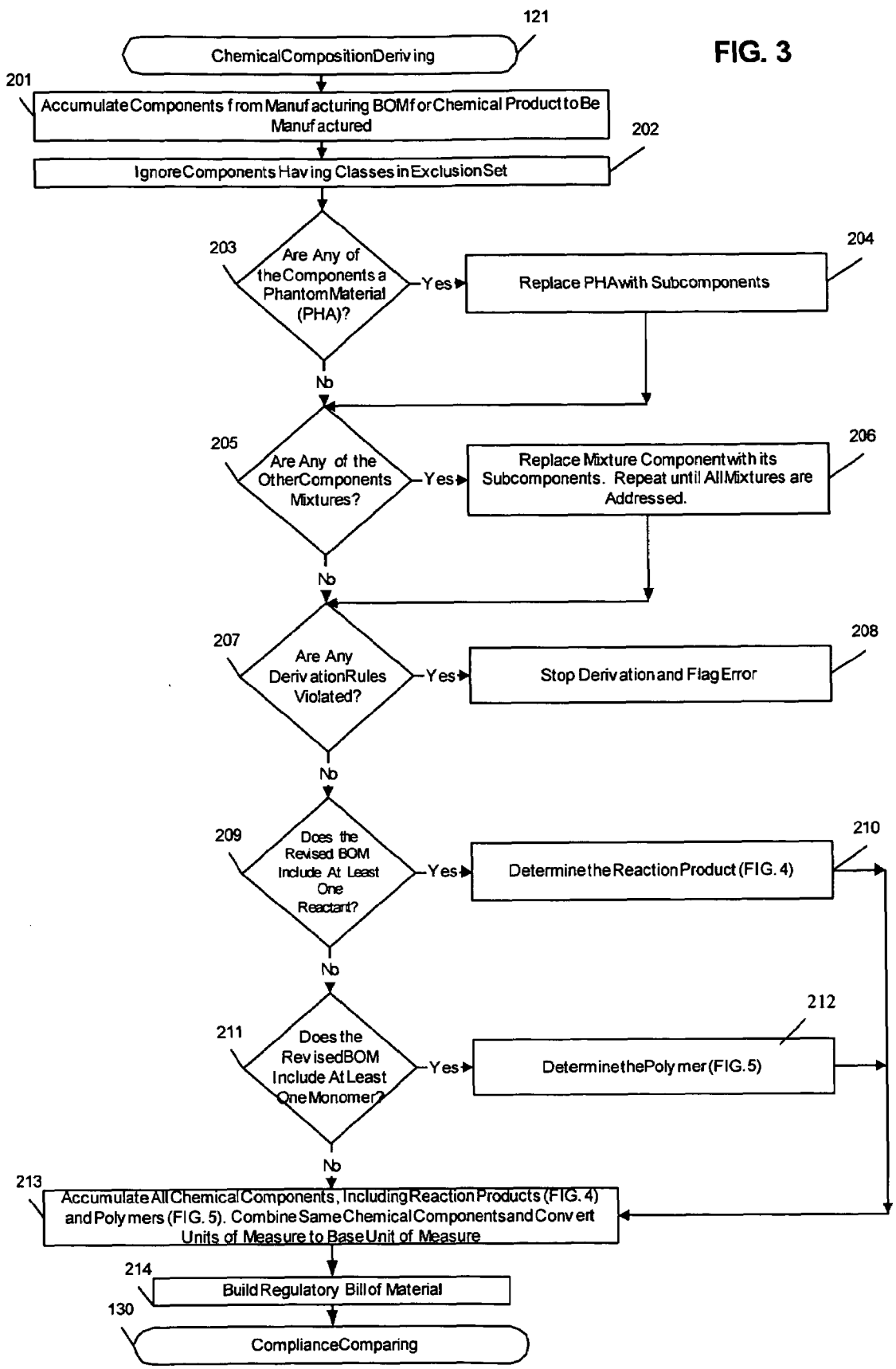
FIG. 3 illustrates a flow diagram of a method according to some embodiments of the present invention.
Figure 4:
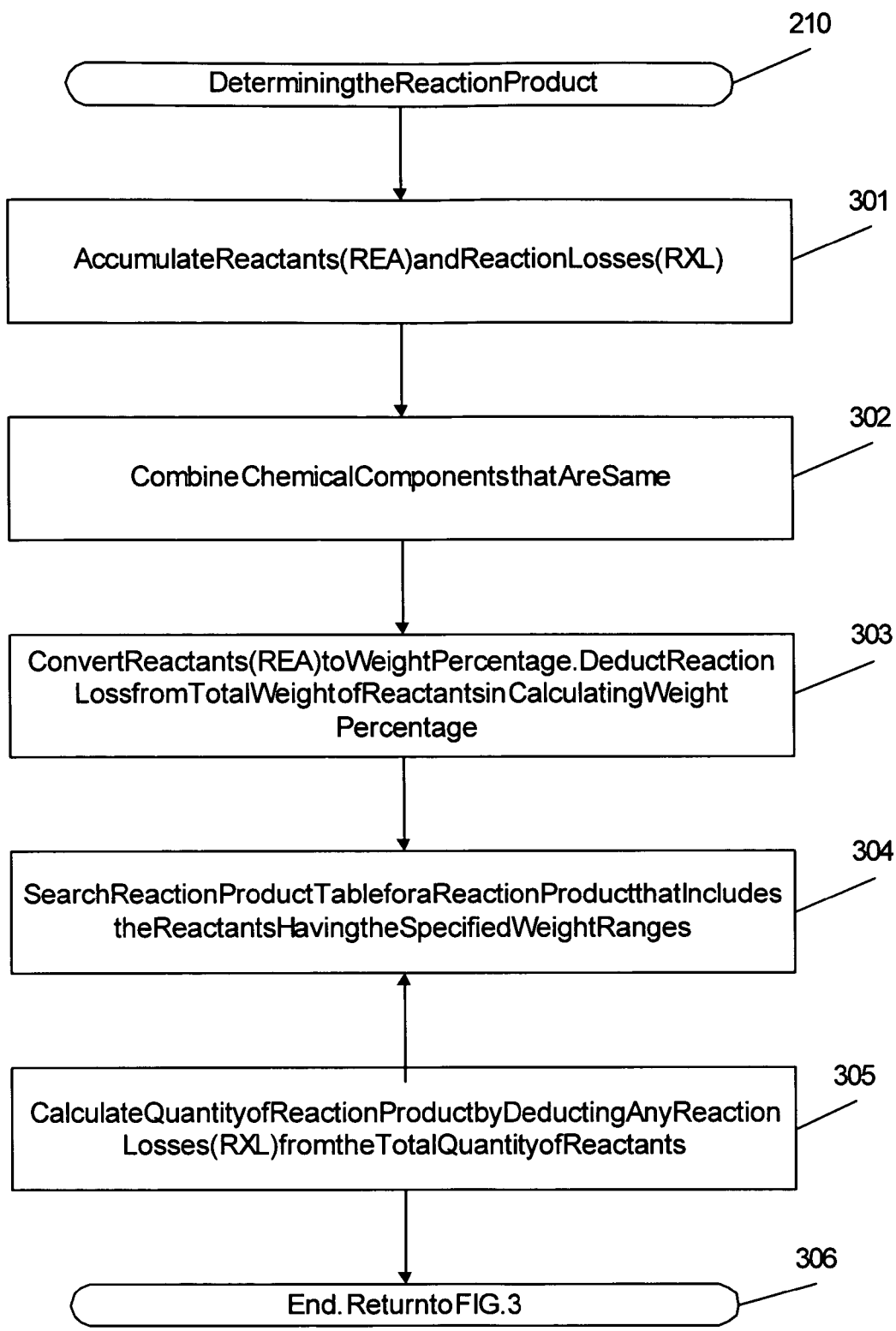
FIG. 4 illustrates a flow diagram of a method for determining a reaction product from a manufacturing bill of material according to some embodiments of the present invention.
Figure 5:
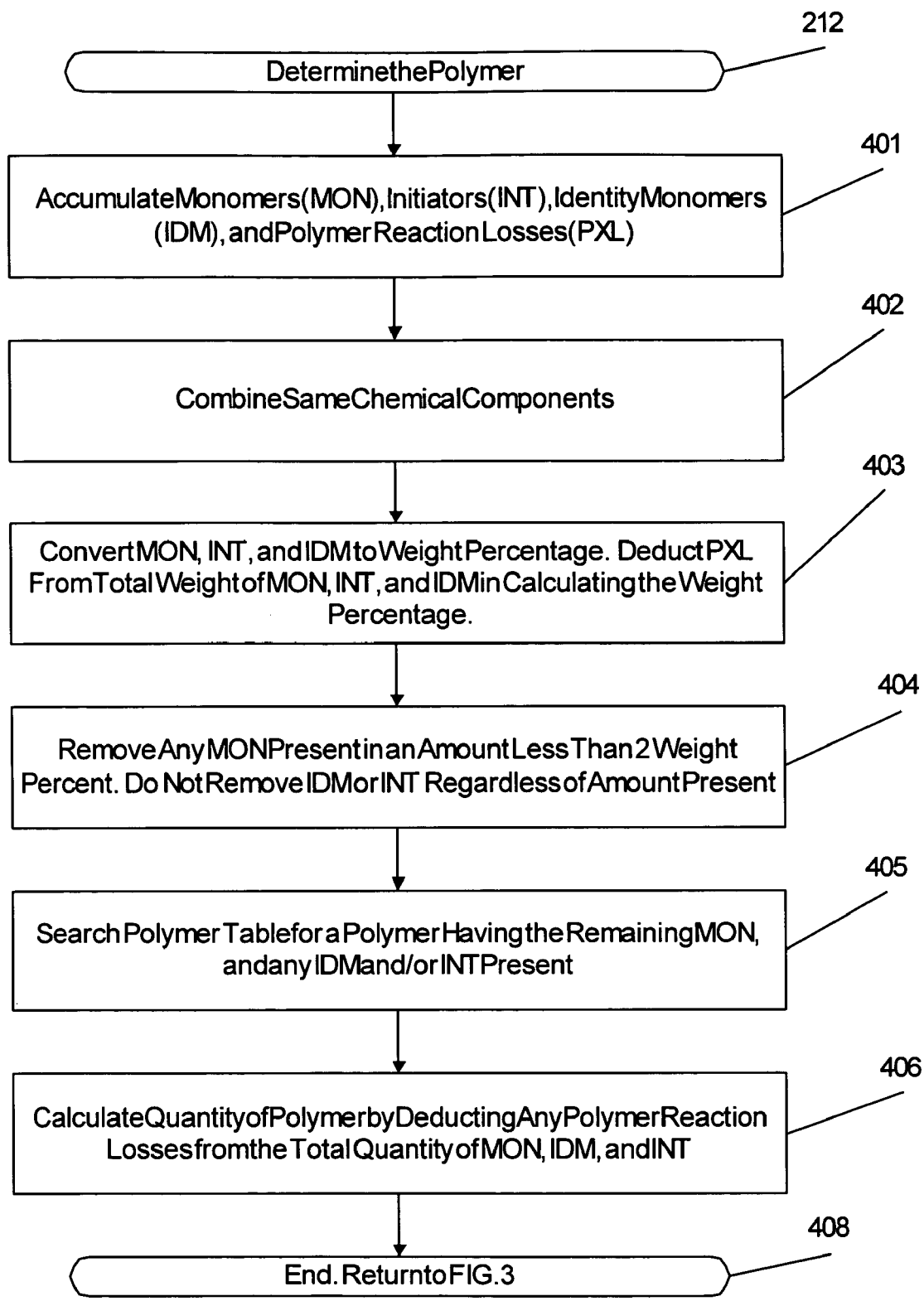
FIG. 5 illustrates a flow diagram of a method for determining a polymer from a manufacturing bill of material according to some embodiments of the present invention.

FIGS. 3-5 are flow diagrams illustrating some embodiments of methods of the present invention. Referring now to FIG. 3, chemical composition deriving (Block 121 of FIG. 1) will now be described in detail. As shown at block 201, the manufacturing bill of material 115 is read, and the components on the manufacturing bill of material are accumulated to ascertain the composition of the chemical product to be manufactured. As noted above, some embodiments of the present invention comprise ignoring components having particular predetermined component classes. In some embodiments, components having the following component classes can be ignored: ignore materials (IGN), packaging materials (PAC), and process solvent materials (SPR). In block 202, components having a component class in such an exclusion set are ignored and removed for purposes of determining regulatory compliance in some embodiments.

A revised bill of material with such components removed can be generated in some embodiments. In some embodiments, the revised bill of material can be used and modified during chemical composition deriving 121 until the analysis is complete and a regulatory bill of material is generated. It should be noted that in some embodiments, if there are no changes made, a revised bill of material (and the regulatory bill of material) can include the same components as the manufacturing bill of material.

Returning to FIG. 3, the remaining components are then reviewed to determine 203 if any of the components are classified as phantom materials (PHA). If there are phantom materials on the bill of material, each phantom material is replaced 204 with its subcomponents. As noted above, each of the subcomponents, in some embodiments, can have the same information associated with it as components. Each of the phantom material subcomponents can be added to the revised bill of material. In some embodiments, if the subcomponent belongs to a class that is to be excluded (e.g., the same excluded classes from block 202), the subcomponent can be excluded from the revised bill of material.

In block 205, the remaining components on the revised bill of material are reviewed to determine if any of the remaining components are mixtures. In some embodiments, components belonging to the following component classes can be reviewed to determine if the component comprises a mixture: reactant materials (REA), monomer materials (MON), identity monomer materials (IDM), and initiator materials (INT). If any of the components are mixtures, each mixture is replaced 206 with its subcomponents in some embodiments. As noted above, each of the subcomponents, in some embodiments, can have the same information associated with it as components. Each of the mixture subcomponents can be added to the revised bill of material. In some embodiments, if the subcomponent belongs to a class that is to be excluded (e.g., the same excluded classes from block 202), the subcomponent is excluded from the revised bill of material.

As noted above, some embodiments of the present invention include derivation rules to assist in deriving the composition of the chemical product to be manufactured. As shown in blocks 207 and 208, if any of the derivation rules are violated, the derivation is stopped and the error is flagged in some embodiments.

In block 209, the revised bill of material is reviewed to determine whether any of the components are reactant materials. If the revised bill of material includes at least one component that is a reactant material, then a reaction product can be determined 210. The derivation of reaction products are discussed in more detail in connection with FIG. 4.

In block 211, the revised bill of material can be reviewed to determine whether any of the components are monomer materials or identity monomer materials. If the revised bill of material includes at least one component that is a monomer material or identity monomer material, then a polymer can be determined 212. The derivation of polymers are discussed in more detail in connection with FIG. 5.

If the revised bill of material does not comprise any reactant materials, monomer materials, identity monomer materials, initiator materials, then the chemical product can be a mixture in some embodiments.

Any polymers or reaction products derived can replace their corresponding components (e.g., REA, MON, IDM, INT, etc.) in the revised bill of material. Any polymers or reaction products are combined 213 with the unreacted or unpolymerized components on the revised bill of material. Any chemical components that are the same can be combined 213 by adding their quantities together, and their units of measure can be converted to a base unit of measure. All of the components in the revised bill of material are then built 214 into a regulatory bill of material 122. The regulatory bill of material, in some embodiments, can then be reviewed for compliance with regulations in connection with compliance comparing 130.

The derivation of reaction products 210 in accordance with some embodiments of the present invention will now be discussed in connection with FIG. 4. All reactants and reaction losses in the revised bill of material are accumulated 301 into a working table for analysis. Any chemical components that are the same are combined 302 by adding their quantities together. The quantities of the reactants are then converted 303 into weight percentages. The following formula can be used to calculate the weight percentage of the reactants in some embodiments:

$$\frac{\text{Reactant Weight} * 100}{\text{Total Weight of Reactants}}$$

The weight percentage of each reactant can be calculated in some embodiments.

Once the weight percentages of the reactants are calculated 303, a reaction product table is searched 304, in some embodiments, to identify a reaction product that is made from the reaction of the same components present here and in the same relative amounts. A reaction product table, in some embodiments, can list each reaction product produced by a chemical manufacturer. For each reaction product, in such embodiments, the reactant or plurality of reactants used to produce the reaction product are associated with the reaction product. In addition, a range of weight percentages can be associated with each reactant to indicate the relative amounts of each reactant needed to make the reaction product. Thus, in searching the reaction product table 304 in some embodiments of the present invention, a match occurs when both the types and amounts of reactants correspond with a reaction product in the table. The amount of reaction product, in some embodiments, can be the total amount of reactants minus the amount of any reaction losses. In other words, the amount of reaction losses can be deducted from the total amount of reactants to arrive at an amount of reaction product.

The quantity of the reaction product, in some embodiments, can be calculated 305 by deducting any reaction losses (RXL) in the revised bill of material from the total quantity of reactants. For example, if the amount of reactants totaled 1,000 kilograms, but there was a reaction loss of 200 kilograms (e.g., from the generation of water, gas, or other component that will not be part of the chemical product), the total amount of reaction product will be 800 kilograms. The reaction product can then be returned 306 for further processing as shown in FIG. 3.

The derivation of polymers 212 in accordance with some embodiments of the present invention will now be discussed in connection with FIG. 5. All monomers (MON), identity monomers (IDM), initiators (INT), and polymer reaction losses (PXL) in the revised bill of material can be accumulated 401 into a working table for analysis. Any chemical components that are the same are combined 402 by adding their quantities together. The quantities of the components are then converted 403 into weight percentages. In calculating the total amount of monomers and initiators to use in the denominator of the weight percentage formula, the quantity of any polymer reaction losses can be deducted from the total weight of the monomers, identity monomers, and initiators in some embodiments. The following formula can be used to calculate the weight percentage of the component in some embodiments:

$$\frac{\text{Polymer Component Weight} * 100}{(\text{Total Polymer Components Weight} - \text{Polymer Reaction Losses Weight})}$$

The weight percentage of each component can be calculated in some embodiments.

In some embodiments, once the weight percentages of the components are calculated 403, the weight percentages of the monomers (MON) and initiators (INT) are reviewed to determine if any are present in an amount below two weight percent. If a monomer (MON) or initiator (INT) is present in an amount less than two weight percent, the monomer (MON) or initiator (INT) can be removed 404 in some embodiments. Identity monomers (IDM) that are present in an amount in less than two weight percent are not removed in some embodiments. In other words, in such embodiments, identity monomers (IDM) can be included in polymer derivation regardless of the amount of identity monomer (IDM) present. This operation can be performed in some embodiments because many regulations do not require new regulatory compliance notification for polymers that contain less than 2% of an additional monomer. If this "2% Rule" is being used, then at block 404, the weight percentages of the remaining components can be recalculated.

A polymer table can be searched 405 based on the remaining components, in some embodiments, to identify a polymer that is made from the reaction of the remaining components and their relative amounts. A polymer table, in some embodiments, can list each polymer produced by a chemical manufacturer. For each polymer, the monomers, identity monomers, or initiators, or combinations thereof, used to produce the polymer can be associated with the polymer in such embodiments. Thus, in searching the polymer table 405 in some embodiments of the present invention, a match occurs when the types of monomers/identity monomers/initiators correspond with a polymer in the table.

In some embodiments, a polymer table can also list a range of weight percentages that can be associated with each of the components to indicate the relative amounts of each monomer/identity monomer/initiator needed to make the polymer. Thus, in searching a polymer table in such embodiments, a match can occur when the types and amounts of monomers/identity monomers/initiators correspond with a polymer in the table.

The quantity of the polymer can be calculated 406 by deducting any polymer reaction losses (PXL) from the revised bill of material from the total quantity of monomers (MON), identity monomers (IDM), and initiators (INT). For example, if the amount of monomers/identity monomers/initiators totaled 1,000 kilograms, but there was a polymer reaction loss of 200 kilograms (e.g., from the generation of water, gas, or other component that will not be part of the chemical product), the total amount of polymer will be 800 kilograms. The polymer and other remaining, unreacted components can then be returned 408 for further processing as shown in FIG. 3.

In some embodiments, the present invention can facilitate the update of bills of material and other information based on a change in a material or component, a change in a bill of material, or other changes. A number of factors can cause such changes. For example, if the supplier of a particular component modifies a material it supplies to the manufacturer (e.g., includes an additive), data about the component will need to be updated in the present system to reflect the inclusion of the additive in some embodiments. As another example, the chemical manufacturer can modify its bill of material to include an additive, to increase the amount of a reactant, or to make another change.

Such changes (e.g., in components, subcomponents, bills of material) can affect other bill of material in the system. For example, a material in a first bill of material can have its own bill of material associated with it. If a change is made to the material's bill of material, then all bills of material where the material appears will also need to be updated. Similarly, any bill of material that includes the first bill of material will also need to be changed.

Thus, in some embodiments, methods of the present invention can comprise determining whether a modified material or a modified bill of material is used in other bills of material. If so, some methods can comprise updating all affected bills of material. In some embodiments, the affected bills of material can be automatically updated. In some embodiments, the affected bills of material can be updated as a background process (e.g., to minimize effect on system resources). In some embodiments, the bills of material can be updated in real-time (e.g., as the change to the material or bill of material is made), rather than as a periodic batch process. Some embodiments of the present invention can further comprise notifying a system user if a predetermined number of bills of material will be affected. For example, if a large number of bills of material will be affected, the system user can reconsider the change to the material or bill of material. The system user, in some embodiments, can need approval from another person to make a change in the material or bill of material if a predetermined number of bills of material are affected.

EXAMPLES OF CHEMICAL COMPOSITION DERIVING

Although detailed flowcharts have been provided for chemical composition deriving in FIGS. 2-5, specific examples will now be provided to illustrate some embodiments of the present invention. It will be understood that these examples are illustrative and are not to be viewed as limiting. Three examples will be given: calculating a regulatory bill of material for a simple polymer, calculating a regulatory bill of material for a more complex polymer, and calculating a regulatory bill of material when the components include reactants.

Example 1

Given: Manufacturing Bill of Material for Polymer A, Product Identification Number (Product ID) P0000100, 10,000 kg basis:

| Product ID | Description | Quantity | Unit of Measure | Component Class | Sub-class | Target Quantity |
|---|---|---|---|---|---|---|
| P0000001 | Monomer 1 | 5,000 | kg | MON | — | 100.0000 |
| P0000002 | Monomer 2 | 5,000 | kg | MON | — | 100.0000 |

1. Read the manufacturing bill of material and select the components that are relevant for ascertaining the chemical composition. Ignore any component classes in the exclusion set. For these examples, the exclusion set includes the following component classes: IGN, PAC, and SPR. Accumulate the relevant components:

| | | | |
|---|---|---|---|
| P0000001 | 5,000 kg | MON | 100.0000 |
| P0000002 | 5,000 kg | MON | 100.0000 |

2. The bill of material does not include any phantom materials (PHA) to expand or accumulate.

3. The bill of material does not include any components that are mixtures requiring a subclass (no mixtures to expand to include subcomponents).

4. The components' class assignments do not violate any derivation rules.

5. The components have the same units of measure and there is not a need to convert from a non-standard unit of measure.

6. The components include at least one monomer, so the components for use in deriving polymer are:

| | |
|---|---|
| 5,000 kg P0000001 (pure) MON | |
| 5,000 kg P0000002 (pure) MON | |

7. Obtain chemical identifier (Chemical ID) from Reference Table:

| Product ID | Description | Purity | Chemical ID |
|---|---|---|---|
| P0000001 | Monomer 1 | pure | 1100001 |
| P0000002 | Monomer 2 | pure | 1100002 |

5,000 kg P0000001 (pure) MON = 5,000 kg 1100001 MON
5,000 kg P0000002 (pure) MON = 5,000 kg 1100002 MON 8. No target quantity reductions or combination of the same substances are necessary.

9. Convert polymer component set to weight percentages using the following formula:

$$\frac{\text{Polymer Component Weight} * 100}{(\text{Total Polymer Components Weight} - \text{Polymer Reaction Losses Weight})}$$

This Example does not include any polymer reaction losses. The weight percentages of the polymer set components are:

| |
|---|
| 1100001 MON = 50.0000% |
| 1100002 MON = 50.0000% |

9. Neither monomer in the polymer component set is present in an amount less than 2 weight percent, so neither monomer will be removed. Thus, the component set for comparison to the polymer table is:
1100001, 1100002

The Polymer Table is searched for a polymer containing 1100001 and 1100002.

| Description | Chemical ID | Monomer Set |
|---|---|---|
| Polymer A | 1100050 | 1100001 |
| | | 1100002 |
| Polymer B | 1100051 | 1100003 |
| | | 1100004 |
| | | 1100005 |

Polymer A (Chemical ID 110050) is a polymer that includes monomer sets 1100001 and 1100002.

10. The revised bill of material did not include any non-reactant components, so none need to be added to the regulatory bill of material.

11. The final derived composition is written to the regulatory bill of material and is shown below:

| Product ID | Chemical ID | Description | Quantity | Unit of Measure |
|---|---|---|---|---|
| P0000100 | 1100050 | Polymer A | 100.0000 | Weight % |

Example 2

Given: Manufacturing Bill of Material for Polymer B, Product Identification Number (Product ID) P0000200, 10,000 kg basis:

| Product ID | Description | Quantity | UofM | Component Class | Sub-class | Target Quantity |
|---|---|---|---|---|---|---|
| P0000003 | Monomer 3 | 3,000 | Kg | MON | | 100.0000 |
| P0000004 | Monomer 4 | 2,401 | Kg | MON | 002 | 100.0000 |
| P0000005 | Monomer 5 | 99 | Kg | IDM | | 100.0000 |
| P0000006 | Water | 500- | Kg | PXL | | 100.0000 |
| P0000007 | Catalyst | 10 | Kg | CAT | | 100.0000 |
| P0000008 | Process solvent | 200 | Kg | SPR | | 100.0000 |
| P0000009 | Product solvent 1 | 4,990 | Kg | SPD | | 100.0000 |
| P0000014 | Drum | 1,000 | Ea | PAC | | 100.0000 |

1. Read the manufacturing bill of material and select the components that are relevant for ascertaining the chemical composition. Ignore any component classes in the exclusion set. For these examples, the exclusion set includes the following component classes: IGN, PAC, and SPR. The process solvent (Product ID P0000008) is not included because it has a component class of SPR (process solvent). The drum (Product ID P0000014) is not included because it has a component class of PAC (packaging material). Water (Product ID P0000006) on this bill of material is a polymer reaction loss and is shown as a negative quantity. Accumulate the relevant components:

| | | | | |
|---|---|---|---|---|
| P0000003 | 3,000 kg | MON | | 100.0000 |
| P0000004 | 2,401 kg | MON | 002 | 100.0000 |
| P0000005 | 99 kg | IDM | | 100.0000 |
| P0000006 | 500- kg | PXL | | 100.0000 |

-continued

| | | | |
|---|---|---|---|
| P0000007 | 10 kg | CAT | 100.0000 |
| P0000009 | 4,990 kg | SPD | 100.0000 |

2. The bill of material does not include any phantom materials (PHA) to expand or accumulate.

3. The bill of material does include a component that is a mixture that should be expanded. Because monomer 4 (Product ID P0000004) includes a subclass (subclass 002), monomer 4 is a mixture. A set of tables is present in some embodiments of the present invention, where the components (or subcomponents) of each material associated with a bill of material component are stored, along with subclasses if the material is polymerized on a bill of material. The table for Product ID P0000004/subclass 002 is:

| Product ID | Chemical ID | Description | Component Class | Weight % |
|---|---|---|---|---|
| P0000004 | 1100004 | Monomer | MON | 99.9900% |
| P0000004 | 1100016 | Additive | ADD | 0.0100% |

The subcomponents of monomer 4 (P0000004) are categorized as follows:

| |
|---|
| 1100004 at 99.9900 weight % as MON |
| 1100016 at 0.0100 weight % as ADD |

Thus, since 2,401 kg of monomer 4 are present and using these weight percents, 2400.7599 kg of the monomer (Chemical ID 1100004) and 0.2401 kg of the additive (Chemical ID 1100016) are present.

4. The components' class assignments do not violate any derivation rules.

5. The components have the same units of measure and there is not a need to convert from a non-standard unit of measure.

6. The components include at least one monomer, so the components for use in deriving the polymer are:

| | |
|---|---|
| 3,000 kg | P0000003 (pure) MON |
| 2,400.7599 kg | P0000004 (pure) MON |
| 99 kg | P0000005 (pure) IDM |
| 500- kg | P0000006 (pure) PXL |

The subcomponents of Product ID P0000004 are separately considered. The monomer portion (2400.7599 kg 1100004) is used in the polymer derivation, but the additive portion (0.2401 kg 1100016) is not.

7. Obtain chemical identifier (Chemical ID) from Reference Table:

| Product ID | Description | Component Class | Purity | Chemical ID |
|---|---|---|---|---|
| P0000003 | Monomer 3 | MON | pure | 1100003 |
| P0000004 | Monomer 4 | MON | pure | 1100004 |
| P0000005 | Monomer 5 | IDM | pure | 1100006 |
| P0000006 | Water | PXL | pure | 1100007 |

| | |
|---|---|
| 3,000 kg | P0000003 (pure) MON = 3,000 kg 1100003 MON |
| 2,400.7599 kg | P0000004 (pure) MON = 2,400.7599 kg 1100004 MON |
| 99 kg | P0000005 (pure) IDM = 99 kg 1100006 IDM |
| 500- kg | P0000006 (pure) PXL = 500- kg 1100007 PXL |

8. No target quantity reductions or combination of the same substances are necessary.

9. Convert polymer component set to weight percentages using the following formula:

$$\frac{\text{Polymer Component Weight} * 100}{(\text{Total Polymer Components Weight} - \text{Polymer Reaction Losses Weight})}$$

This Example includes a polymer reaction loss. The amount of polymer reaction losses (500-kg P0000005) is deducted from the total weight of the polymer component set, such that the total weight of the polymer component set is 4999.7599 kg. Also, while polymer reaction losses are used in calculating the total weight of the polymer component set and to determine the weight percentages, the polymer reaction losses are not a part of the polymer component set and are not used to identify the polymer (except to the extent that the polymer reaction losses affect weight percentages). The weight percentages of the polymer set components are:

| |
|---|
| 1100003 MON = (3000/4999.7599) * 100 = 60.0029% |
| 1100004 MON = (2400.7599/4999.7599) * 100 = 48.0175% |
| 1100005 IDM = (99/4999.7599) * 100 = 1.9801% |

9. Neither monomer (MON) in the polymer component set is present in an amount less than two weight percent, so neither monomer will be removed. There are no initiator materials present in the revised bill of material, so none need to be removed for being present in an amount less than two weight percent. The identity monomer (IDM) is present in an amount less than two weigh percent. However, in this embodiment, identity monomers (IDM) that are present in an amount in less than two weight percent are not removed and are included in the polymer component set regardless of the amount present. Thus, the polymer component set for comparison to the polymer table is:

1100003, 1100004, 1100005

The Polymer Table is searched for a polymer containing 1100003, 1100004, and 1100005.

| Description | Chemical ID | Monomer Set |
|---|---|---|
| Polymer A | 1100050 | 1100001 |
| | | 1100002 |
| Polymer B | 1100051 | 1100003 |
| | | 1100004 |
| | | 1100005 |

Polymer B (Chemical ID 110051) is a polymer that includes monomer sets 1100003, 1100004, and 1100005.

10. The remaining unreacted components are added to the revised bill of material. These components are:

| | | | |
|---|---|---|---|
| P0000007 | 10 kg | CAT | 100.0000 |
| P0000009 | 4,990 kg | SPD | 100.0000 |
| P0000004 | 0.2401 kg | ADD | 100.0000 |

The 0.2401 kilograms of the additive are the result of monomer 4 (Product ID P0000004) being a mixture (2,401 kilograms of P0000004 comprised 0.0100 weight percent ADD). The units of each component in the revised bill of material are the same, so not units of measure need to be converted.

11. The chemical identifiers (Chemical ID) of the unreacted components are obtained from Reference Table:

| Product ID | Description | Component Class | Purity | Chemical ID |
|---|---|---|---|---|
| P0000007 | Catalyst | CAT | pure | 1100008 |
| P0000009 | Product Solvent 1 | SPD | pure | 1100010 |
| P0000004 | Additive | ADD | pure | 1100016 |

| | |
|---|---|
| 10 kg | P0000007 (pure) CAT = 10 kg 1100008 CAT |
| 4,9990 kg | P0000009 (pure) SPD = 4,990 kg 1100010 SPD |
| 0.2401 kg | P0000004 (pure) ADD = 0.2401 kg 1100016 ADD |

12. The remaining components, including polymer, additive, catalyst, and product solvent materials are accumulated to arrive at a final revised bill of material:

| | |
|---|---|
| 4,999.7599 kg | 1100051 |
| 10 kg | 1100008 |
| 4,990 kg | 1100010 |
| 0.2401 kg | 1100016 |

13. The amounts of the remaining components are converted to weight percentages. The final revised bill of material is written to the regulatory bill of material and is shown below:

| Product ID | Chemical ID | Description | Quantity | Unit of Measure |
|---|---|---|---|---|
| P0000200 | 1100051 | Polymer B | 49.9976 | Weight % |
| P0000007 | 1100008 | Catalyst | 0.1000 | Weight % |
| P0000009 | 1100010 | Product Solvent 1 | 49.9000 | Weight % |
| P0000004 | 1100016 | Additive | 0.0024 | Weight % |

Example 3

Given: Manufacturing Bill of Material for Product C, Product Identification Number (Product ID) P0000300, 10,000 kg basis:

| Product ID | Description | Quantity | UofM | Component Class | Subclass | Target Quantity |
|---|---|---|---|---|---|---|
| P0000010 | Chemical 1 | 8,000 | Kg | REA | 004 | 100.0000 |
| P0000011 | Chemical 2 | 3,000 | Kg | REA | | 100.0000 |
| P0000012 | Chemical 3 | 1,000- | Kg | RXL | | 100.0000 |
| P0000013 | Catalyst (bed) | 10 | Kg | IGN | | 100.0000 |

1. Read the manufacturing bill of material and select the components that are relevant for ascertaining the chemical composition. Ignore any component classes in the exclusion set. For these examples, the exclusion set includes the following component classes: IGN, PAC, and SPR. The catalyst bed (Product ID P0000013) is not included because it has a component class of IGN (ignore material). Chemical 3 (Product ID P0000012) on this bill of material is a reaction loss material and is shown as a negative quantity. Accumulate the relevant components:

| | | | | |
|---|---|---|---|---|
| P0000010 | 8,000 kg | REA | 004 | 100.0000 |
| P0000011 | 3,000 kg | REA | | 100.0000 |
| P0000012 | 1,000- kg | RXL | | 100.0000 |

2. The bill of material does not include any phantom materials (PHA) to expand or accumulate.

3. The bill of material does include a component that is a mixture that should be expanded. Because chemical 1 (Product ID P0000010) includes a subclass (subclass 004), chemical 1 is a mixture. A set of tables is present in some embodiments of the present invention, where the components (or subcomponents) of each material associated with a bill of material component are stored, along with subclasses if the material is reacted on a bill of material. The table for Product ID P0000010/subclass 004 is:

| Product ID | Chemical ID | Description | Component Class | Weight % |
|---|---|---|---|---|
| P0000010 | 1100017 | Chemical 4 | REA | 50.0000% |
| P0000010 | 1100018 | Product Solvent 2 | SPD | 50.0000% |

The subcomponents of chemical 1 (P0000010) are categorized as follows:

| |
|---|
| 1100017 at 50.0000 weight % as REA |
| 1100018 at 50.0000 weight % as SPD |

Thus, since 8,000 kg of chemical 1 are present and using these weight percents, 4,000 kg of chemical 4 (Chemical ID 1100017) and 4,000 kg of product solvent 2 (Chemical ID 1100018) are present.

4. The components' class assignments do not violate any derivation rules.

5. The components have the same units of measure and there is not a need to convert from a non-standard unit of measure.

6. The components include at least one reactant, so the components for use in deriving the reaction product are:

| | | |
|---|---|---|
| 4,000 kg | P0000010 | (pure) REA |
| 3,000 kg | P0000011 | (pure) REA |
| 1,000- kg | P0000012 | (pure) RXL |

The subcomponents of Product ID P0000010 are separately considered. The reactant portion (4,000 kg 1100017) is used in the reaction product derivation, but the product solvent portion (4,000 kg 1100018) is not.

7. Obtain chemical identifier (Chemical ID) from Reference Table:

| Product ID | Description | Component Class | Purity | Chemical ID |
|---|---|---|---|---|
| P0000010 | Chemical 4 | REA | pure | 1100017 |
| P0000011 | Chemical 2 | REA | pure | 1100013 |
| P0000012 | Chemical 3 | RXL | pure | 1100014 |

| | | |
|---|---|---|
| 4,000 kg P0000010 (pure) REA = | 4,000 kg 1100017 REA | |
| 3,000 kg P0000011 (pure) REA = | 3,000 kg 1100013 REA | |
| 1,000- kg P0000012 (pure) RXL = | 1,000- kg 1100014 RXL | |

8. No target quantity reductions or combination of the same substances are necessary.

9. Convert reaction component set to weight percentages using the following formula:

$$\frac{\text{Reactant Weight} * 100}{\text{Total Weight of Reactants}}$$

The weight percentages of the reactants are:

| | |
|---|---|
| 1100017 REA = (4000/7000) * 100 = 57.1429% | |
| 1100013 REA = (3000/7000) * 100 = 42.8571% | |

9. A Reaction Product Table is searched for a reaction product containing both reactants (1100017 and 1100013). In addition, in this embodiment, the Reaction Product Table includes weight percentage ranges associated with each reactant. When a match is found, the reactants must be within the allowable ranges specified on the table:

| Description | Chemical ID | Reactant Set | Weight % Range |
|---|---|---|---|
| Reaction Product C | 1100052 | 1100013 | >=30 and <=50 |
| | | 1100017 | >=50 and <=70 |
| Reaction Product D | 1100053 | 1100013 | >=20 and <=30 |
| | | 1100017 | >=50 and <=70 |
| | | 1100025 | >=5 and <=30 |

Reaction Product C (Chemical ID 110052) is a reaction product that includes reactant 1100013 in an amount between 30 and 50 weight percent and reactant 1100017 in an amount between 50 and 70 weight percent.

10. In determining the amount of the reaction losses taken into account. Thus, the amount of reaction losses is deducted from the total amount of reactants. In this example, 6,000 kilograms of reaction product are produced (7,000 kg of 1100017 and 1100013 minus 1,000 kg of reaction loss).

11. The remaining unreacted components are added to the revised bill of material. The only component is:

| | | |
|---|---|---|
| P0000010 | 4,000 kg | SPD |

The 4,000 kilograms of product solvent 2 are the result of chemical 1 (Product ID P0000010) being a mixture (4,000 kilograms of P0000010 comprised 50.0000 weight percent SPD). The units of each component in the revised bill of material are the same, so not units of measure need to be converted.

12. The chemical identifiers (Chemical ID) of the unreacted components are obtained from Reference Table:

| Product ID | Description | Component Class | Purity | Chemical ID |
|---|---|---|---|---|
| P0000010 | Product Solvent 2 | SPD | Pure | 1100018 |

4,000 kg P00000010 (pure) SPD=4,000 kg 1100018 SPD

13. The remaining components, including the reaction product and product solvent material, are accumulated to arrive at a final revised bill of material:

| | |
|---|---|
| 6,000 kg | 1100052 |
| 4,000 kg | 1100018 |

14. The amounts of the remaining components are converted to weight percentages. The final revised bill of material is written to the regulatory bill of material and is shown below:

| Product ID | Chemical ID | Description | Quantity | Unit of Measure |
|---|---|---|---|---|
| P0000300 | 1100052 | Chemical C | 60.0000 | Weight % |
| P0000010 | 1100018 | Product Solvent 2 | 40.0000 | Weight % |

Compliance Comparing 130: Overview

Once a regulatory bill of material is obtained, the regulatory bill of material can be checked for regulatory compliance in some embodiments. In response to an automated product sales order entry 111, and the regulatory bills of material 122 corresponding to the automated product sales order entry 111, regulatory compliance verifying 133 compares the chemical compositions 122 to a stored set of government regulatory standards that are contained in regulatory databases 131 and maintained by regulatory database maintenance 132 in order to determine compliance. Prior to describing the details of compliance comparing 130, background on regulatory compliance and overall rules for compliance will be described.

The U.S. chemical industry is regulated by many laws including but not limited to TSCA, RCRA, SARA, CDTA, FIFRA, FFDCA. Other countries have many similar laws that control the chemicals that may be used for commercial use within their boundaries. An overview of these laws will now be provided.

Toxic Substances Control Act (TSCA)

TSCA is a complex set of laws that defines all chemicals (which include polymers) as being either "existing" or "new". Existing chemicals are those which are on a list called the TSCA inventory. Existing chemicals were placed on the inventory either by grandfathering when TSCA was enacted or by premanufacture notification since that time. Existing chemicals may be used (with some exceptions) for any commercial application. New chemicals, on the other hand, generally must be reviewed by the Environmental Protection Agency (EPA) and approved prior to use for commercial applications. The review process is called Pre-Manufacture Notification (PMN).

Thus, a first aspect of regulatory compliance verifying 133 is to ensure that all of the chemicals (or all of the components in mixtures) used, manufactured or sold in the U.S. are on the TSCA inventory. This can be accomplished by determining the composition of the products and checking them against a computerized list of chemicals on the TSCA inventory in the regulatory database 131.

There are several exemptions to listing all chemicals on the TSCA inventory. One exemption is the TSCA Research and Development exemption. This states that a company need not make a premanufacture notification for any chemicals that are used solely for research and development purposes. However, there are restrictions on how these chemicals must be handled and managed. Briefly, research and development chemicals may be used, sampled and even evaluated as long as they are not placed into commerce. Thus, orders for these chemicals, which are not on the TSCA inventory, must be checked to ensure that only certain customers can order them. The links between approved customers and the R&D products can be made in regulatory compliance verifying 133 and orders entered by nonapproved customers can be blocked.

Another aspect of TSCA is that a manufacturer must notify the EPA each time it samples or sells any of certain listed chemicals into another country for the first time. Keeping up with dozens of such chemicals and over a hundred countries can be difficult. Making this requirement more difficult is that the rule does not have a minimum limit for impurities or additives. Thus, it can be important to know the exact composition of each and every product so that proper notifications can be made.

Another aspect of TSCA is that the EPA can request data on chemicals that contain or are made with certain chemicals at its will. A manufacturer may need to identify any products that contain those chemicals in order to determine its reporting liabilities. This aspect may not result in an order block, but can rely on the compositional data to determine what reports must be made.

Similar laws have been enacted in Canada, the European Union, Australia, Japan, China, South Korea and the Philippines. The Regulatory Compliance Verifying 133 interacts with all of these nations by checking both the ship-from country and the ship-to country and against the inventories of each country. Generally, all of these inventories can be different.

Federal Insecticide Fungicide and Rodenticide Act (FIFRA)

Pesticides are regulated by FIFRA and not by the general TSCA law. Thus, the Regulatory Compliance Verifying 133 identifies any materials or products that are pesticides and checks their compliance with pesticide laws in the world. The sale of pesticides may be restricted to specific customers by linking the material identity to the customer location number and other customers would be blocked if they attempt to order a restricted chemical.

Chemical Diversion and Trafficking Act (CDTA)

The Drug Enforcement Administration (DEA) administers the CDCA. This regulation requires a manufacturer to maintain certain records, to establish a list of approved customers for certain chemicals, to notify DEA immediately of any new potential customers and to hold their orders for 15 days while the DEA investigates them, and to notify and hold all export orders for those certain chemicals. The regulatory compliance verifying block 133 can ensure that all customers for these chemicals are approved prior to shipment.

Chemical Weapons Convention (CWC)

This treaty prohibits the development, production, stockpiling, and use of chemical weapons. The treaty does not prohibit production, processing, consumption, or trade of related chemicals for peaceful purposes, but it does establish a verification regime to ensure such activities are consistent with the object and purpose of the treaty. In some embodiments, the regulatory compliance verifying block can include the ability to limit the sales of CWC chemicals.

Customer-Specific Chemicals

The regulatory compliance verifying block can also be able to limit the sale of any chemical to one or more specific customers. This can be used when toll manufacturing a chemical for a customer, if the chemical is subject to a secrecy agreement, or if the manufacturer and customer have otherwise entered an agreement limiting the sale of the chemical.

Figure 6:
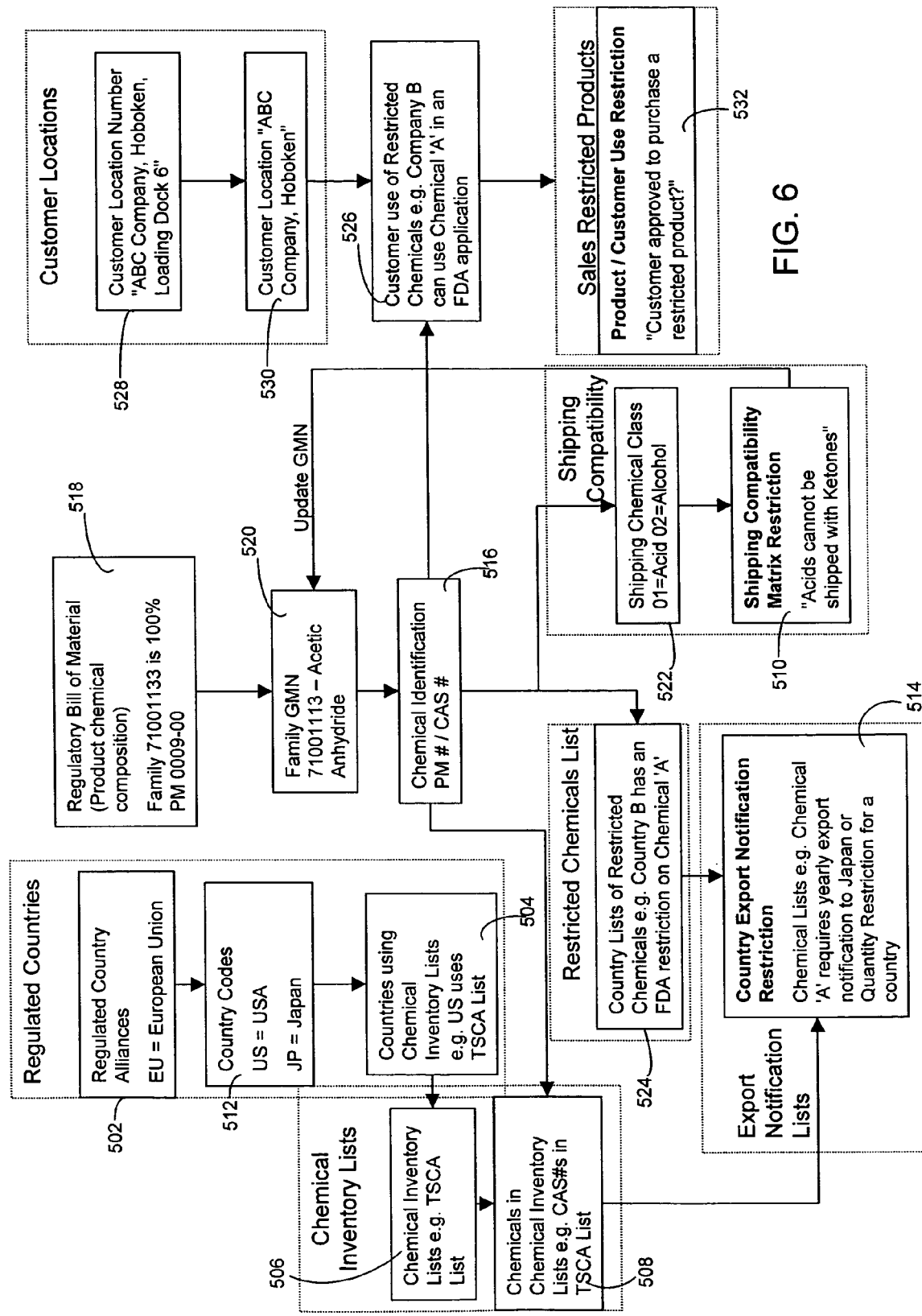
FIG. 6 illustrates regulatory databases according to some embodiments of the present invention.

The regulatory databases 131 include listings of chemicals that are regulated by these various regulations. These databases can be provided by outside suppliers or can be generated internally by studying the regulations. An example of some embodiments of regulatory databases is shown in FIG. 6. Since the present invention is independent of the details in the regulatory databases 131, a detailed description of each database need not be provided. A detailed description of a regulatory database, such as a TSCA database, may be found in National Chemical Inventories, as available from Chemical Abstracts Service, the disclosure of which is hereby incorporated herein by reference.

An overview of some embodiments of business rules for regulatory compliance verifying 133 will now be provided. These embodiments of the rules can be embodied in the regulatory databases 131 (FIG. 6) and can be maintained and updated by regulatory database maintenance (Block 132 of FIG. 1):

1. Customer locations: An enterprise resource planning computer product, such as SAP, can include customer location codes 528. However, such customer location codes 528 can include more detail than is needed to determine regulatory compliance, such that a generic "city location" customer number 530 can be used in some embodiments.

2. Regulated countries 502, 504, 512. This list includes countries that have enacted regulations governing the import of chemicals across their borders. If a ship-from or ship-to country is not regulated, then no regulatory checks are required for that country. The rules check both the ship-from and the ship-to countries on the order.

3. Chemical Inventory Lists 506, 508. Most heavily industrialized countries have their own published lists of chemicals that are legal for import. If a product is to be imported into one of those countries, then the product's chemical components must all be on that country's approved list of chemicals. In the U.S., the approved list of chemicals is covered under the "Toxic Substances Control Act" (TSCA).

4. Restricted Chemical Lists 524. There are chemical restrictions specific to countries that define rules outside of the Chemical Inventory Lists. Some of these rules prevent shipment to countries/customers; others allow shipment under specific conditions:
   a. If a chemical is FDA-restricted, then customers must be approved to buy the chemical.
   b. If a chemical is DEA-restricted, then customers must be approved to buy the chemical.
   c. If a chemical is an ozone-depleting agent, shipment may be disallowed.
   d. If a chemical is a chemical-warfare agent, disallow shipment.
   e. If a chemical is flagged for research and development use only in a region, then a check is made to see if an annual or cumulative volume limit applies. If so, then the calculated order volume of the chemical is summed to the respective accumulators, unless the limit is exceeded.
   f. If chemical has commercial annual or cumulative volume limits, the same types of checks and summations are done as in 2e above. Note that research and development vs. commercial limits are generally mutually exclusive.
   g. If a chemical is banned, it is banned in a country, not in an Alliance. Shipments are not allowed if the chemical is banned in the ship-to country.

5. Export Notification Lists 514. The U.S. government has two chemical inventory lists dealing with chemicals that are exported to other countries. One list is the Annual Export Notification List. If a chemical on this list is shipped to any country during the year, the EPA requires a formal notification the first time it is shipped every year. The other list is the One-Time Export Notification List, which means that if a chemical on this list is shipped to any country at any time, the EPA requires a formal notification the first time a manufacturer records a shipment. These notifications can be sent as automatic faxes to the EPA. The logic can avoid sending false notifications: no notifications are sent if the logic detects any other type of order exception.

6. State Regulations. Although not shown in FIG. 6, some states have their own regulations which can be applicable to some chemical products. For example, the state of New York (USA) has a list of chemicals requiring New York customers who store the chemicals in bulk tanks to register the chemical/tank with the state government. If a chemical component is in the NYBS list, then the customer location must be approved for the location to clear the order.

7. Sales-Restricted Products 532. A product can be restricted for sale to any customer for regulatory precautions. Since this check applies to the product and not to the chemical components, the Family GMN 520 is flagged for sales restrictions. The customer must be linked to the Family GMN and be approved to allow the sale.

8. Shipping Compatibility 510. If a chemical is to be shipped in compartmentalized tank cars/trucks, then a shipping compatibility check is made for all products on the order. A compatibility matrix of chemical classifications is maintained, specifying which classes 522 are hazardous to mix. The Family GMNs 520 are updated with the proper chemical classifications to allow the checks to be made.

Details of Regulatory Compliance Verifying Block 133

Figure 7A:
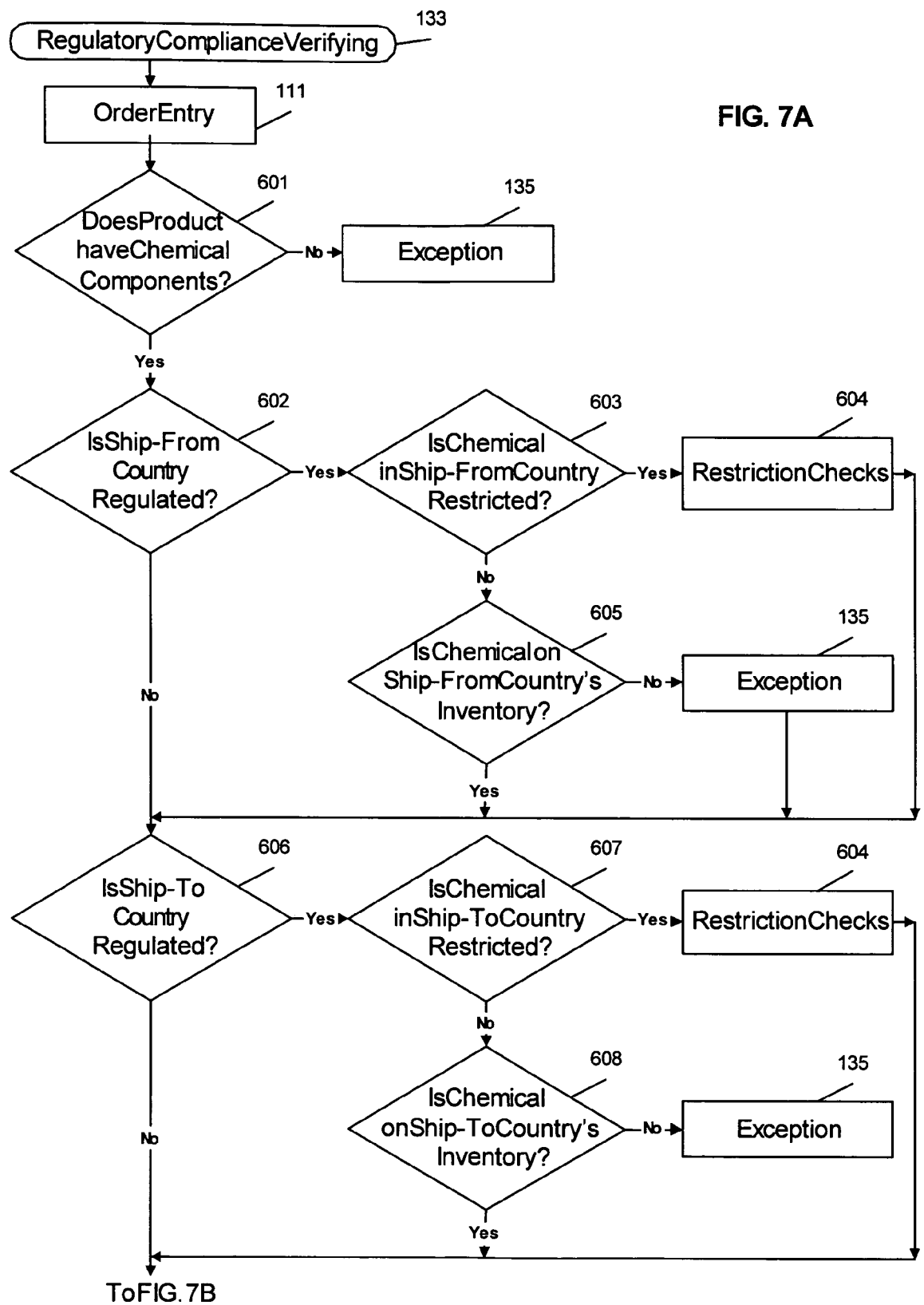
FIGS. 7A, 7B and 7C, which together form FIG. 7 as indicated, illustrate regulatory compliance verifying according to some embodiments of the present invention.
Figure 7B:
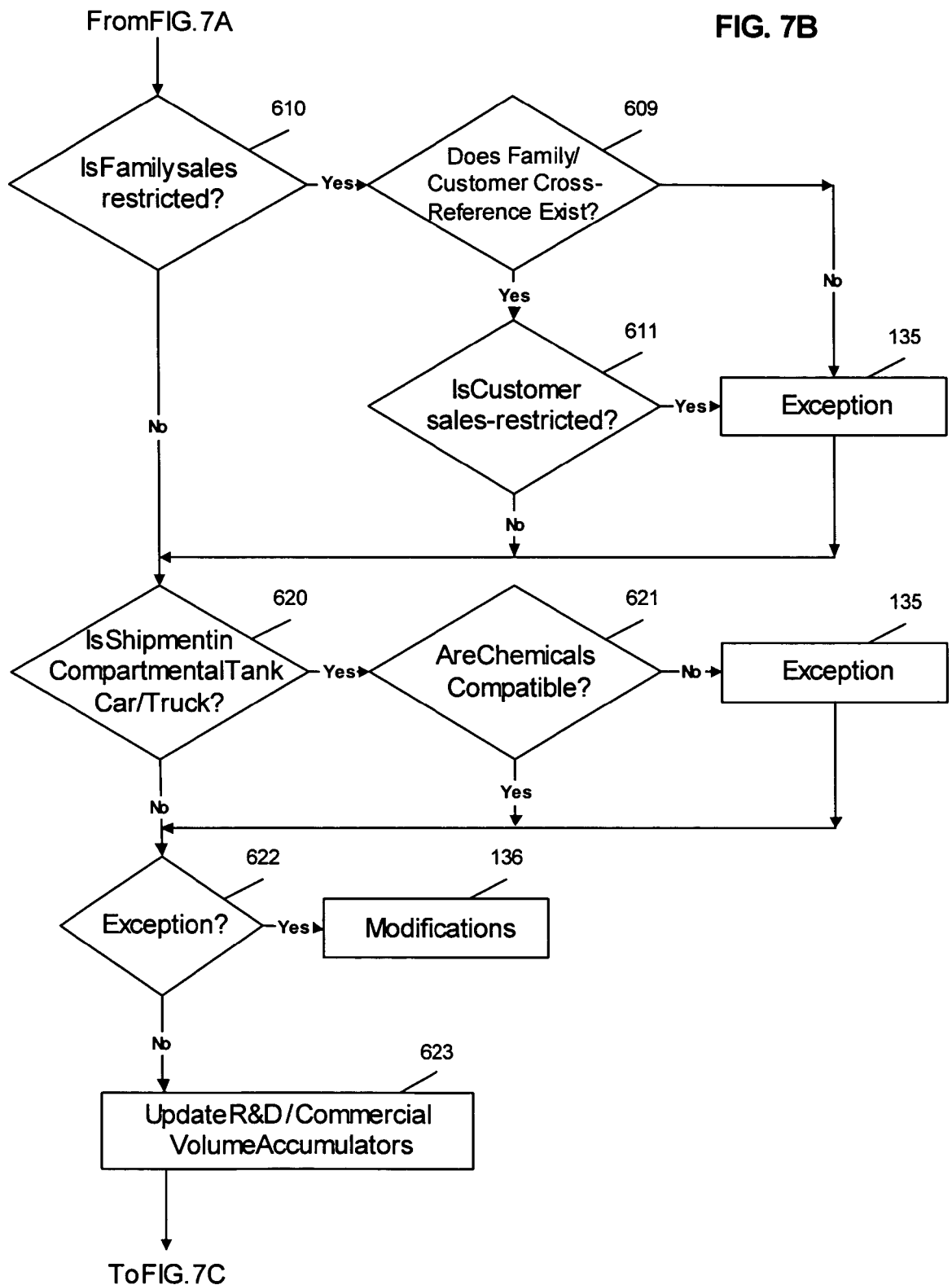
Figure 7C:
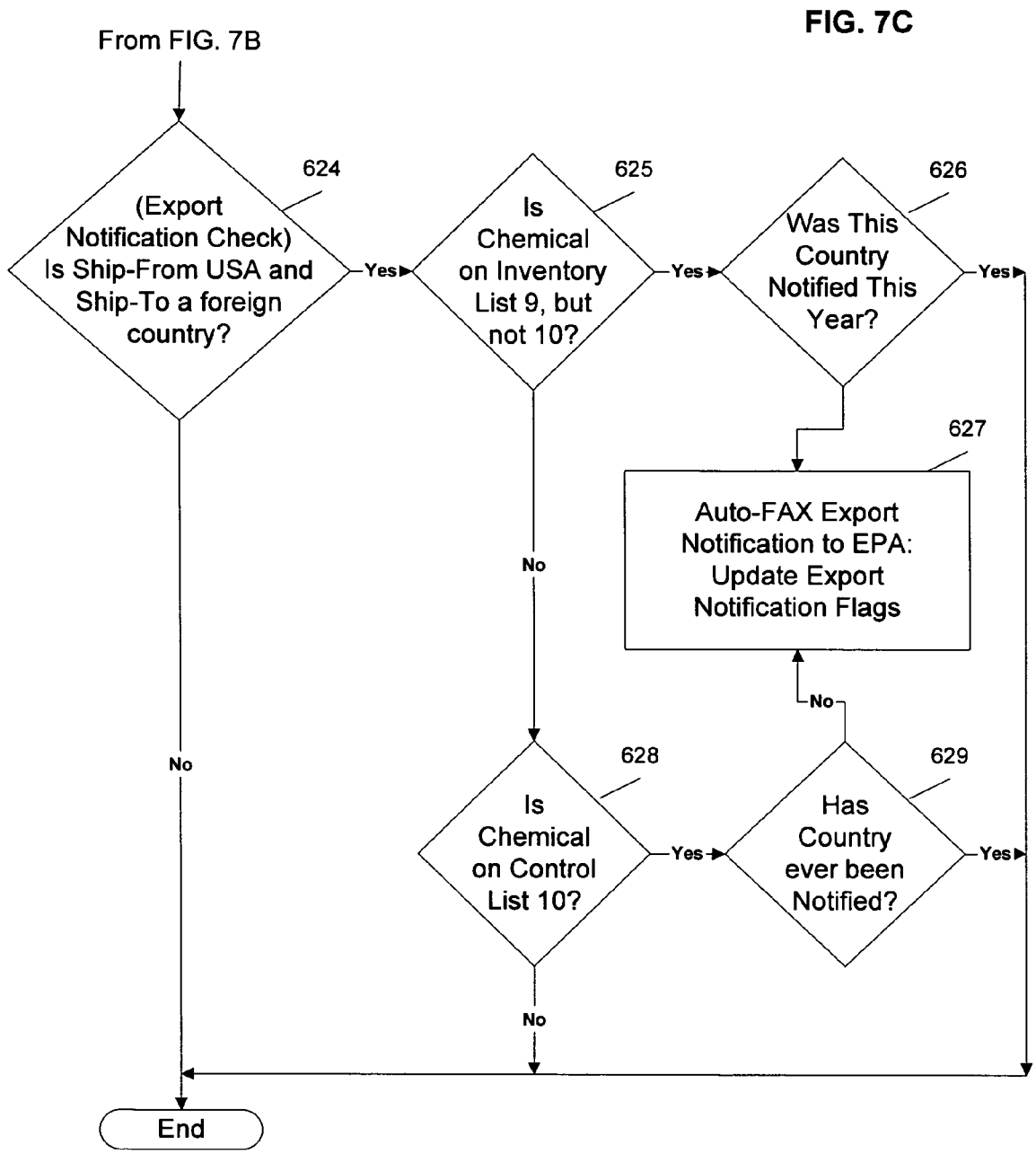

Referring now to FIGS. 7A, 7B and 7C, which together form FIG. 7 as indicated, detailed operations of regulatory compliance verifying 133 of FIG. 1 will now be described. As shown in FIG. 7, in response to an order entry 111, a test is made at Block 601 as to whether the product has chemical components. If NO, an exception is noted (Block 135) and operations end.

Returning to Block 601, if the product has chemical components, then at Block 602 a test is made as to whether the shipped-from country is regulated. This test determines if a country from which the order is shipped is regulated by a law such as TSCA. If the shipped-from country is regulated, then a test is made at Block 603 as to whether a chemical in the shipped-from country is restricted. In particular, countries that have inventories may also exempt some chemicals from inventory listing if they are regulated by other laws enforced at the same time. Examples are chemicals for foods, drugs, cosmetics, pesticides, tobacco, nuclear and chemicals. These are sent for restriction checks at Block 604. Restriction checks will be described in detail in connection with FIG. 8.

If the result of the test of Block 603 is NO, then at Block 604 a test is made as to whether the chemical is on the shipped-from country's inventory. If NO, an exception is issued at Block 135. If YES, then tests are made as to whether the shipped-to country is regulated at Block 606. If YES, then at Block 607, a test is made as to whether the chemical in the shipped-to country is restricted. If YES, restriction checks of FIG. 8 are performed at Block 604. If NO, a test is made as to whether the chemical is on a shipped-to country's inventory at Block 608, and if NO, an exception 135 is produced.

Continuing with the description of FIG. 7, a test is then made at Block 610 as to whether the Family is sales-restricted. In particular, a manufacturer can have many reasons for restricting the sales of certain chemicals to selected customers only. One reason can be toll manufacturing agreements. Other reasons can be restriction on use only to customers who are able to use the chemical safely and only in safe applications. Yet another restriction can be a secrecy agreement. Another restriction can be an agreement with the customer to only supply the customer with the chemical. Thus, the sales restrictions may not be based on regulations but rather may be based on a manufacturer's policy or agreements.

If the Family is sales restricted at Block 610, a test is made at Block 609 as to whether Family or customer cross-references exist that tie the restriction to a particular customer. If NO, then an exception is created at Block 135. If YES, a test is made at Block 611 as to whether the customer is sales-restricted. If YES, an exception is made at Block 135.

A test is then made at Block 620 as to whether a shipment is going to be made in a compartmental tank car or truck. If YES, a test is made at Block 621 as to whether the chemicals are compatible. If not, an exception is created at Block 135.

The test at Block 622 determines whether an exception has ever been made in any of the above operations. If YES, the exception can be indicated. Alternatively, modifications can be made at Block 136. More specifically, an expert system can be used in conjunction with regulatory compliance verifying Block 133 to suggest modifications to the regulatory bill of material 122 to make the chemical compliant. For example, substitutions of components in mixtures that are not in the inventory of existing substances for the shipped-to country can be suggested. Alternatively, compositional information in the database can be used to determine the amounts of SARA chemicals on hand or disposed at a plant site. Compositional information can be used to manage reporting of RCRA wastes and EPCRA releases. The compositional information and bills of material can also be reviewed periodically for opportunities to change to processes that are more environmentally friendly, i.e. "green chemistry." Accordingly, rather than merely flagging an exception, modifications 136 can be proposed.

Continuing with the description of FIG. 7, at Block 623, R&D or commercial volume accumulators are updated as necessary if there were no exceptions. Then, at Block 624, an export notification check is performed by checking whether the chemicals are being shipped from the U.S. to a foreign country. In particular, TSCA Section 12(b) requires that the EPA be notified under certain conditions when specified chemicals are exported for the first time to each country, sometimes annually and sometimes once. See 40 CFR 707.65. Chemicals subject to TSCA Section 4 regulations are notified only once per country. Other chemicals subject to Section 5 or 6 regulations are to be notified each year for each country. Accordingly, a test is made at Block 625 as to which requirement a chemical is subject. If YES, a test is made at Block 626 as to whether this country has been notified yet. If NO, at Block 627, a notification letter is created to produce an export notification to the EPA and export notification flags are updated.

Returning to Block 625, if NO, a test is made at Block 628 as to whether the chemical is on the other control list. If YES, a test is made at Block 629 if the country has ever been notified, and at Block 627 a notification can be sent.

Figure 8A:
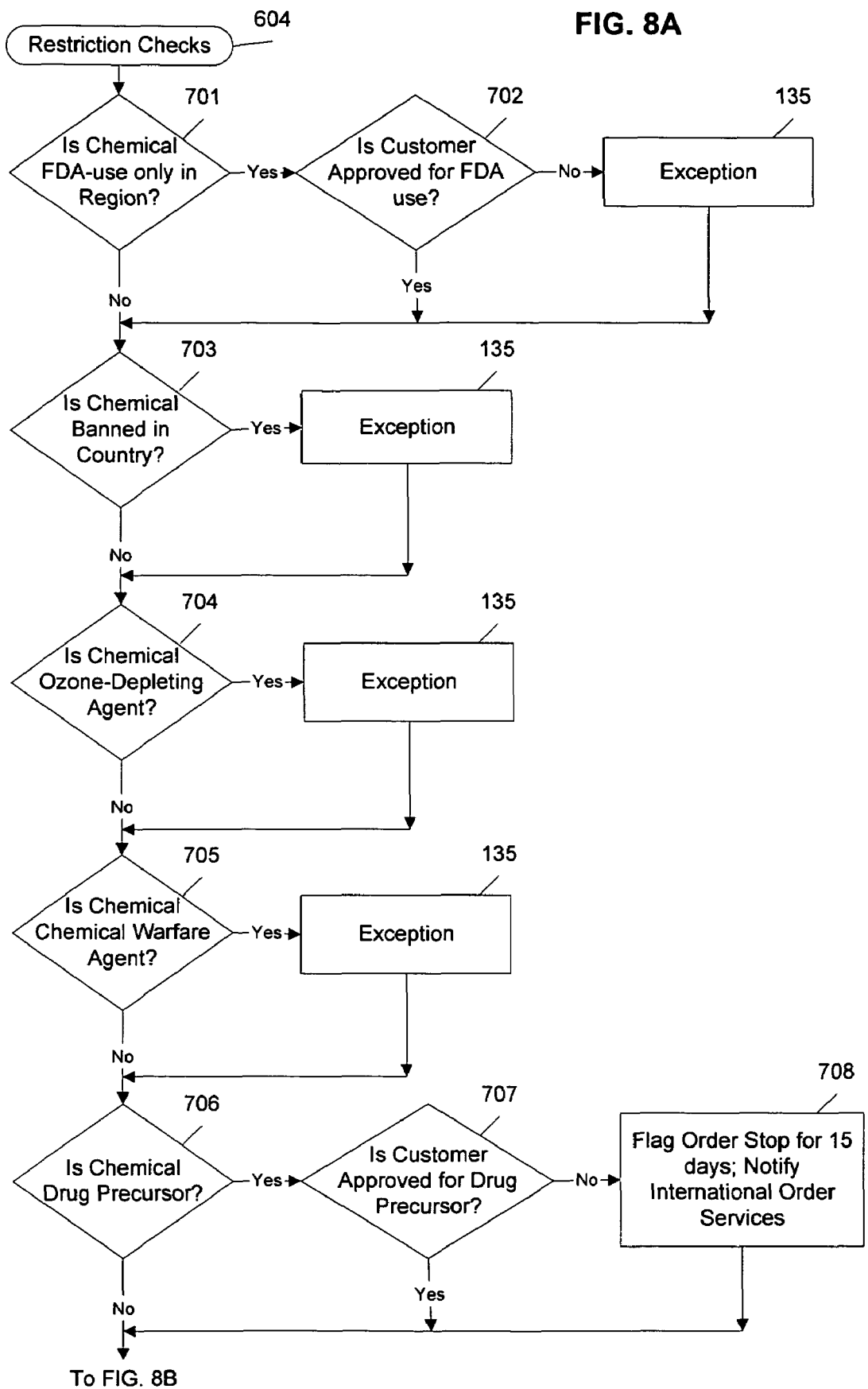

Referring now to FIGS. 8A and 8B, which form FIG. 8 as indicated, operations for restriction checks (Block 604 of FIG. 7) will now be described. At Block 701, a test is made as to whether the chemical is FDA-use only in the region. In particular, chemicals that are used in foods, drugs and cosmetics are regulated by the Federal Food, Drug & Cosmetic Act (FFDCA) in the U.S., and by similar laws in other countries. They are exempt from TSCA and similar laws in other countries. Thus, the check at Block 701 is used to ensure that the customer is ordering such a chemical for use in a food, drug, cosmetic or such applications. The FFDCA regulations are in Title 21 of the Code of Federal Regulations. If YES at Block 701, a test is made at Block 702 as to whether the customer is approved for FDA use. If not, an exception is created at Block 135.

If the chemical is not for FDA uses only at Block 701, a test is made at Block 703 as to whether a chemical is banned in a country. If YES, an exception is created at Block 135.

Then at Block 704, a test is made as to whether the chemical is an ozone-depleting agent. The Montreal Protocol is an international treaty that proposes to reduce the emissions of ozone-depleting substances, such as some of the freons, from further reducing ozone in the atmosphere. The U.S. regulations are located in part 82 of title 40 of the Code of Federal Regulations.

A test is then made at Block 705 as to whether the chemical is a chemical warfare agent. The Chemical Weapons Convention prohibits the development, production, stockpiling, and use of chemical weapons. The treaty does not prohibit production, processing, consumption, or trade of related chemicals for peaceful purposes, but it does establish a verification regime to ensure such activities are consistent with the object and purpose of the treaty.

Referring now to Block 706, a test is made as to whether the chemical is an essential drug precursor. The Drug Enforcement Administration (Department of Justice) permits the export of certain chemicals that are useful for the manufacture and processing of elicit drugs. See 21 CFR 1300 et seq. If YES, then at Block 707, a test is made as to whether a customer is approved for a drug precursor chemical. If not, the order is flagged for 15 days at Block 708 and DEA is notified.

Referring now to Block 709, a test is made as to whether the chemical is for research and development (R&D) use only. TSCA, specifically 40 CFR 710.4(c)(3), exempts certain chemicals from listing on the National Inventory of Commercial Chemical Substances under certain conditions. Other regulations may do the same. Often, the amount of R&D substance which may be manufactured is restricted. At Block 709, if the chemical is R&D-use only, then a test is made at Block 710 as to whether the chemical has R&D annual limits in the shipped-to region. If YES, a test is made at Block 711 as to whether the ordered quantity is greater than the annual limit. If YES, an exception is created at Block 135. If NO, a test is made as to whether the chemical has a cumulative limit in the shipped-to country at Block 712. If YES, a test is made at Block 713 as to whether the ordered quantity exceeds the cumulative limit. If YES, an exception is flagged.

Referring now to Block 714, a test is made as to whether the chemical has commercial manufacture/import limits. Some countries may limit the import or manufacture of R&D chemicals. Some countries or economic regions may impose limits on the amount of chemicals that may be manufactured or used for commercial purposes until toxicity and property testing is submitted to the agencies and is approved. These limits can be both annual and cumulative. Accordingly, if there is a cumulative limit, then at Block 717, a test is made on the ordered quantity, and if YES, an exception 135 is created.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Other embodiments are possible and can be more practical for different applications.

What is claimed is:

1. A method of deriving chemical compositions that are present in a chemical product to be manufactured, comprising the following steps that are performed in a data processing system:

obtaining a bill of material comprising components to manufacture the chemical product;

ascertaining whether any of the components comprises subcomponents;

replacing any components comprising subcomponents with the subcomponents in a revised bill of material; and determining at least one product of a reaction between at least two of the components and subcomponents, the at least one reaction product being present in the manufactured chemical product; and generating a regulatory bill of material comprising information about the at least one reaction product and any unreacted components and subcomponents.

2. The method of claim 1, wherein determining the at least one reaction product comprises comparing the at least two components and subcomponents and the concentrations of components and subcomponents with a plurality of reaction products, wherein each reaction product has at least two components and subcomponents and concentration ranges associated with it.

3. The method of claim 2, wherein each reaction product has a unique combination of components, subcomponents, and concentration ranges associated with it.

4. The method of claim 1, wherein any unreacted components and subcomponents comprise at least one of additives and solvents.

5. The method of claim 1, wherein determining at least one product of a reaction between at least two of the components and subcomponents further comprises determining a quantity of the at least one reaction product.

6. The method of claim 5, wherein determining a quantity of the at least one reaction product comprises deducting a reaction loss quantity from a total quantity of reacted components and subcomponents.

7. The method of claim 6, wherein the reaction loss quantity comprises a quantity of a reaction byproduct that does not comprise a portion of the manufactured chemical product.

8. The method of claim 1, further comprising combining any components or subcomponents that are the same chemical.

9. The method of claim 8, wherein each component and subcomponent has a quantity associated with it and wherein combining any components or subcomponents comprises adding the quantities of the combined components and subcomponents.

10. The method of claim 1, further comprising comparing the chemical compositions on the regulatory bill of materials to a stored set of government regulatory standards relating to the chemical compositions to determine compliance.

11. The method of claim 10, wherein comparing the chemical compositions on the regulatory bill of materials to a stored set of government regulatory standards comprises: comparing the chemical compositions on the regulatory bill of materials to a stored set of government regulatory standards governing the manufacturing location for the manufactured chemical product; and comparing the chemical compositions on the regulatory bill of materials to a stored set of government regulatory standards governing the destination location for the manufactured chemical product.

12. The method of claim 10, further comprising proposing modifications to noncomplying chemical products so that the chemical product to be manufactured becomes complying.

13. The method of claim 1, wherein each of the components and subcomponents comprise an additive, a base, a catalyst, a monomer, a reactant, or a solvent.

14. The method of claim 1, wherein at least one of the components or subcomponents comprises a chemical intermediary or a scrap material.

15. The method of claim 1, wherein at least one of the components comprises a catalyst, a solvent that does not become a part of the manufactured chemical product, or a packaging material.

16. The method of claim 15, further comprising removing any catalyst, any solvent that does not become a part of the chemical product, and any packaging material from the revised bill of material prior determining at least one product of a reaction between at least two of the components and subcomponents.

17. The method of claim 1, wherein at least one of the components or subcomponents has a bill of material associated with it.

18. A method of deriving chemical compositions that are present in a chemical product to be manufactured, comprising the following steps that are performed in a data processing system:
obtaining a bill of material comprising chemical components of the chemical product to be manufactured;
ascertaining whether any of the chemical components comprise subcomponents; replacing the chemical components comprising subcomponents with the subcomponents in a revised bill of material;
assigning a component class to each component and subcomponent, the component classes comprising at least one of bases, additives, reactants, and monomers;
deriving from the revised bill of material the chemical compositions present in the manufactured chemical product; and
generating a regulatory bill of material comprising information about the chemical compositions present in the manufactured chemical product.

19. The method of claim 18, further comprising verifying that the revised bill of material does not comprise a predetermined combination of component classes.

20. The method of claim 19, further comprising generating an error when the revised bill of material comprises a predetermined combination of component classes.

21. The method of claim 20, wherein the predetermined combination comprises at least one monomer and at least one reactant.

22. The method of claim 20, wherein the predetermined combination comprises at least one reactant and at least one base.

23. The method of claim 20, wherein the predetermined combination comprises at least one monomer and at least one base.

24. The method of claim 18, wherein each component and subcomponent in the revised bill of material has a quantity and a unit of measure associated with it, and further comprising converting the units of measures of each component and subcomponent to a base unit of measure.

25. The method of claim 18, wherein deriving from the revised bill of material the chemical compositions present in the manufactured chemical product comprises determining the chemical compositions from the components, the subcomponents, and the component classes.

26. The method of claim 25, wherein at least two of the components and subcomponents have a component class of reactant and wherein determining the chemical compositions comprises determining at least one product of a reaction between at least two reactants.

27. The method of claim 26, wherein each of the at least two reactants has a concentration associated with it.

28. The method of claim 27, wherein determining at least one product of a reaction between at least two reactants comprises comparing the at least two reactants and the concentrations of the at least two reactants with a plurality of reaction products, wherein each reaction product has a plurality of reactants and reactant concentration ranges associated with it.

29. The method of claim 28, wherein each reaction product has a unique combination of reactants and reactant concentration ranges associated with it.

30. The method of claim 28, wherein the concentration of each reactant is the quotient of the quantity of the reactant divided by the total quantity of all reactants.

31. The method of claim 27, wherein each reaction product has a unique combination of reactants and reactant concentration ranges associated with it.

32. The method of claim 26, wherein determining at least one product of a reaction between the at least two reactants comprises determining a quantity of the at least one reaction product.

33. The method of claim 32, wherein determining a quantity of the at least one reaction product comprises deducting a reaction loss quantity from a total quantity of reactants.

34. The method of claim 33, wherein the reaction loss quantity comprises a quantity of a reaction byproduct that does not comprise a portion of the manufactured chemical product.

35. The method of claim 34, wherein the component classes further comprise reaction losses, wherein the bill of material comprises the reaction byproduct, and wherein the reaction byproduct is associated with the reaction loss class.

36. The method of claim 26, wherein the regulatory bill of material comprises information about the reaction product and any unreacted components and subcomponents.

37. The method of claim 36, wherein the unreacted components and subcomponents comprise at least one of additives and solvents.

38. The method of claim 25, wherein at least one of the components and subcomponents has a component class of monomer, and wherein determining the chemical compositions comprises determining at least one polymer based on polymerization of the at least one monomer.

39. The method of claim 38, wherein determining the at least one polymer comprises comparing the at least one monomer with a plurality of polymers, wherein each polymer has at least one monomer associated with it.

40. The method of claim 39, wherein each polymer has a unique monomer or combination of monomers associated with it.

41. The method of claim 38, wherein determining the at least one polymer further comprises determining a quantity of the at least one polymer.

42. The method of claim 41, wherein determining a quantity of the at least one polymer comprises deducting a polymer reaction loss quantity from a total quantity of polymerized components and subcomponents.

43. The method of claim 42, wherein the polymer reaction loss quantity comprises a quantity of a polymerization byproduct that does not comprise a portion of the manufactured chemical product.

44. The method of claim 43, wherein the component classes further comprise polymer reaction losses, wherein the bill of material comprises the polymerization byproduct, and wherein the polymerization byproduct is associated with the polymer reaction loss class.

45. The method of claim 38, wherein the regulatory bill of material comprises information about the at least one polymer and any unpolymerized components and subcomponents.

46. The method of claim 45, wherein the unpolymerized components and subcomponents comprise at least one of additives and solvents.

47. The method of claim 25, wherein the component classes further comprise at least one of initators and identity monomers, wherein at least one of the components and subcomponents has a component class of monomers or identity monomers, and wherein determining the chemical compositions comprises determining at least one polymer based on polymerization of the at least one monomer or identity monomer.

48. The method of claim 47, wherein determining at least one polymer comprises comparing the at least one monomer or identity monomer and any initiators with a plurality of polymers, wherein each polymer has at least one combination of monomers, identity monomers, and initiators associated with it.

49. The method of claim 48, wherein each polymer has a unique combination of monomers, identity monomers, and initiators associated with it.

50. The method of claim 47, wherein the regulatory bill of material comprises information about the at least one polymer and any unpolymerized components and subcomponents.

51. The method of claim 50, wherein the unpolymerized components and subcomponents comprise at least one of additives and solvents.

52. The method of claim 18, wherein at least one of the components or subcomponents comprises a chemical intermediary or a scrap material.

53. The method of claim 18, wherein the component classes further comprise at least one of catalysts, solvents that do not become a part of the manufactured chemical product, and packaging materials.

54. The method of claim 53, further comprising removing any components or subcomponents having a component class of catalyst, solvent that does not become a part of the chemical product, or packaging material.

55. The method of claim 18, wherein at least one of the components or subcomponents has a bill of material associated with it.

56. A system for deriving chemical compositions that are present in a chemical product to be manufactured, comprising:
means for obtaining a bill of material comprising components to manufacture the chemical product;
means for ascertaining whether any of the components comprises subcomponents;
means for replacing any components comprising subcomponents with the subcomponents in a revised bill of material;
means for determining at least one product of a reaction between at least two of the components and subcomponents, the at least one reaction product being present in the manufactured chemical product; and
means for generating a regulatory bill of material comprising information about the at least one reaction product and any unreacted components and subcomponents.

57. A system for deriving chemical compositions that are present in a chemical product to be manufactured, comprising:
means for obtaining a bill of material comprising chemical components of the chemical product to be manufactured;
means for ascertaining whether any of the chemical components comprise subcomponents;
means for replacing the chemical components comprising subcomponents with the subcomponents in a revised bill of material;
means for assigning a component class to each component and subcomponent, the component classes comprising at least one of bases, additives, reactants, and monomers; and means for deriving from the revised bill of material the chemical compositions present in the manufactured chemical product.

58. A computer-readable medium containing computer-executable instructions for processing data comprising:
   computer program code for obtaining a bill of material comprising components to manufacture the chemical product;
   computer program code for ascertaining whether any of the components comprises subcomponents;
   computer program code for replacing any components comprising subcomponents with the subcomponents in a revised bill of material; and
   computer program code for determining at least one product of a reaction between at least two of the components and subcomponents, the at least one reaction product being present in the manufactured chemical product; and
   computer program code for generating a regulatory bill of material comprising information about the at least one reaction product and any unreacted components and subcomponents.

59. A computer-readable medium containing computer-executable instructions for processing data:
   computer program code for obtaining a bill of material comprising chemical components of the chemical product to be manufactured;
   computer program code for ascertaining whether any of the chemical components comprise subcomponents;
   computer program code for replacing the chemical components comprising subcomponents with the subcomponents in a revised bill of material;
   computer program code for assigning a component class to each component and subcomponent, the component classes comprising at least one of bases, additives, reactants, and monomers; and
   computer program code for deriving from the revised bill of material the chemical compositions present in the manufactured chemical product.

60. A method of deriving chemical compositions that are present in a chemical product to be manufactured, comprising the following steps that are performed in a data processing system:
   obtaining a bill of material comprising components to manufacture the chemical product;
   ascertaining whether any of the components comprises subcomponents;
   replacing any components comprising subcomponents with the subcomponents in a revised bill of material;
   deriving from the revised bill of material at least one product of a reaction by comparing at least two of the components and subcomponents and the concentrations of such components and subcomponents with a plurality of reaction products, wherein each reaction product has at least two components and subcomponents and concentration ranges associated with it; and
   generating a regulatory bill of material comprising information about the at least one product of a reaction and any unreacted components and subcomponents.

61. The method of claim 60, wherein each reaction product has a unique combination of components, subcomponents, and concentration ranges associated with it.

62. The method of claim 60, wherein the unreacted components and subcomponents comprise at least one of additives and solvents.

63. The method of claim 60, wherein deriving from the revised bill of material at least one product of a reaction further comprises determining a quantity of the at least one product of a reaction.

64. The method of claim 63, wherein determining a quantity of the at least product of a reaction comprises deducting a reaction loss quantity from a total quantity of reacted components and subcomponents.

65. The method of claim 64, wherein the reaction loss quantity comprises a quantity of a reaction byproduct that does not comprise a portion of the manufactured chemical product.

66. A method of deriving chemical compositions that are present in a chemical product to be manufactured, comprising the following steps that are performed in a data processing system:
   obtaining a bill of material comprising components to manufacture the chemical product;
   ascertaining whether any of the components comprises subcomponents;
   replacing any components comprising subcomponents with the subcomponents in a revised bill of material;
   determining at least one product of a reaction between at least two of the components and subcomponents;
   determining a quantity of the at least one reaction product; and
   generating a regulatory bill of material comprising information about the at least one reaction product and any unreacted components and subcomponents.

67. The method of claim 66, wherein determining a quantity of the at least one reaction product comprises deducting a reaction loss quantity from a total quantity of reacted components and subcomponents.

68. The method of claim 67, wherein the reaction loss quantity comprises a quantity of a reaction byproduct that does not comprise a portion of the manufactured chemical product.

69. The method of claim 66, further comprising comparing the chemical compositions on the regulatory bill of materials to a stored set of government regulatory standards relating to the chemical compositions to determine compliance.

70. The method of claim 69, wherein comparing the chemical compositions on the regulatory bill of materials to a stored set of government regulatory standards comprises: comparing the chemical compositions on the regulatory bill of materials bill of materials to a stored set of government regulatory standards governing the manufacturing location for the manufactured chemical product; and comparing the chemical compositions on the regulatory bill of materials to a stored set of government regulatory standards governing the destination location for the manufactured chemical product.

71. The method of claim 69, further comprising proposing modifications to noncomplying chemical products so that the chemical product to be manufactured becomes complying.

72. A method of deriving chemical compositions that are present in a chemical product to be manufactured, comprising the following steps that are performed in a data processing system:
   obtaining a bill of material comprising components to manufacture the chemical product;
   ascertaining whether any of the components comprises subcomponents;
   replacing any components comprising subcomponents with the subcomponents in a revised bill of material;

determining at least one polymer based on polymerization of at least one component or subcomponent in the revised bill of materials by comparing the at least one component or subcomponent with a plurality of polymers, wherein each of the plurality of polymers has at least one component or subcomponent associated with it; and generating a regulatory bill of material comprising information about the polymer and any unpolymerized components and subcomponents.

73. The method of claim 72, wherein the at least one component or subcomponent in the revised bill of materials comprises a monomer.

74. The method of claim 72, wherein each polymer has a unique component, subcomponent, or combination of components and sub components associated with it.

75. The method of claim 72, wherein the unpolymerized components and subcomponents comprise at least one of additives and solvents.

76. The method of claim 72, further comprising comparing the chemical compositions on the regulatory bill of materials to a stored set of government regulatory standards relating to the chemical compositions to determine compliance.

77. The method of claim 76, wherein comparing the chemical compositions on the regulatory bill of materials to a stored set of government regulatory standards comprises: comparing the chemical compositions on the revised bill of materials to a stored set of government regulatory standards governing the manufacturing location for the manufactured chemical product; and comparing the chemical compositions on the revised bill of materials to a stored set of government regulatory standards governing the destination location for the manufactured chemical product.

78. The method of claim 76, further comprising proposing modifications to noncomplying chemical products so that the chemical product to be manufactured becomes complying.

79. The method of claim 72, wherein determining the at least one polymer further comprises determining a quantity of the at least one polymer.

80. The method of claim 79, wherein determining a quantity of the at least one polymer comprises deducting a polymer reaction loss quantity from a total quantity of polymerized components and subcomponents.

81. The method of claim 80, wherein the polymer reaction loss quantity comprises a quantity of a polymerization byproduct that does not comprise a portion of the manufactured chemical product.

82. The method of claim 72, further comprising combining any components or subcomponents that are the same chemical.

83. The method of claim 82, wherein each component and subcomponent has a quantity associated with it and wherein combining any components or subcomponents comprises adding the quantities of the combined components and subcomponents.

84. The method of claim 72, wherein each of the components and subcomponents comprise an additive, a base, a catalyst, a monomer, a reactant, or a solvent.

85. The method of claim 72, wherein at least one of the components or subcomponents comprises a chemical intermediary or a scrap material.

86. The method of claim 72, wherein at least one of the components comprises a catalyst, a solvent that does not become a part of the manufactured chemical product, or a packaging material.

87. The method of claim 86, further comprising removing any catalyst, any solvent that does not become a part of the chemical product, and any packaging material from the revised bill of material prior to determining the at least one polymer present in the manufactured chemical product.

88. A method of deriving chemical compositions that are present in a chemical product to be manufactured, comprising the following steps that are performed in a data processing system:

obtaining a bill of material comprising components to manufacture the chemical product;

ascertaining whether any of the components comprises subcomponents;

replacing any components comprising subcomponents with the subcomponents in a revised bill of material; and determining at least one polymer based on polymerization of at least one component or subcomponent in the revised bill of materials; and generating a regulatory bill of material comprising information about the polymer and any unpolymerized components and subcomponents.

89. The method of claim 88, wherein the unpolymerized components and subcomponents comprise at least one of additives and solvents.

90. The method of claim 88, wherein determining the at least one polymer further comprises determining a quantity of the at least one polymer.

91. The method of claim 90, wherein determining a quantity of the at least one polymer comprises deducting a polymer reaction loss quantity from a total quantity of polymerized components and subcomponents.

92. The method of claim 91, wherein the polymer reaction loss quantity comprises a quantity of a polymerization byproduct that does not comprise a portion of the manufactured chemical product.

93. The method of claim 88, further comprising comparing the chemical compositions on the regulatory bill of material to a stored set of government regulatory standards relating to the chemical compositions to determine compliance.

94. The method of claim 93, wherein comparing the chemical compositions on the regulatory bill of material to a stored set of government regulatory standards comprises: comparing the chemical compositions on the regulatory bill of material to a stored set of government regulatory standards governing the manufacturing location for the manufactured chemical product; and comparing the chemical compositions on the regulatory bill of material to a stored set of government regulatory standards governing the destination location for the manufactured chemical product.

95. The method of claim 93, further comprising proposing modifications to noncomplying chemical products so that the chemical product to be manufactured becomes complying.

96. A method of deriving chemical compositions that are present in a chemical product to be manufactured, comprising the following steps that are performed in a data processing system:

obtaining a bill of material comprising components to manufacture the chemical product;

ascertaining whether any of the components comprises subcomponents;

replacing any components comprising subcomponents with the subcomponents in a revised bill of material;

determining at least one polymer based on polymerization of at least one component or subcomponent in the revised bill of materials;

determining a quantity of the at least one polymer; and generating a regulatory bill of material comprising information about the polymer and any unpolymerized components and subcomponents.

97. The method of claim 96, wherein determining a quantity of the at least one polymer comprises deducting a polymer reaction loss quantity from a total quantity of polymerized components and subcomponents.

98. The method of claim 97, wherein the polymer reaction loss quantity comprises a quantity of a polymerization byproduct that does not comprise a portion of the manufactured chemical product.

99. The method of claim 96, further comprising comparing the chemical compositions on the regulatory bill of materials to a stored set of government regulatory standards relating to the chemical compositions to determine compliance.

100. The method of claim 99, wherein comparing the chemical compositions on the regulatory bill of materials to a stored set of government regulatory standards comprises: comparing the chemical compositions on the revised bill of materials to a stored set of government regulatory standards governing the manufacturing location for the manufactured chemical product; and comparing the chemical compositions on the revised bill of materials to a stored set of government regulatory standards governing the destination location for the manufactured chemical product.

101. The method of claim 99, further comprising proposing modifications to noncomplying chemical products so that the chemical product to be manufactured becomes complying.

* * * * *